(12) United States Patent
Goebel et al.

(10) Patent No.: US 9,873,834 B2
(45) Date of Patent: Jan. 23, 2018

(54) LIQUID-CRYSTALLINE MEDIUM AND ELECTRO-OPTICAL DISPLAY

(75) Inventors: Mark Goebel, Darmstadt (DE); Elvira Montenegro, Weinheim (DE); Atsutaka Manabe, Bensheim (DE)

(73) Assignee: MERCK PATENT GMBH, Darmstadt (DE)

( * ) Notice: Subject to any disclaimer, the term of this patent is extended or adjusted under 35 U.S.C. 154(b) by 671 days.

(21) Appl. No.: 13/992,411

(22) PCT Filed: Nov. 11, 2011

(86) PCT No.: PCT/EP2011/005692
§ 371 (c)(1),
(2), (4) Date: Jun. 7, 2013

(87) PCT Pub. No.: WO2012/076104
PCT Pub. Date: Jun. 14, 2012

(65) Prior Publication Data
US 2013/0258268 A1 Oct. 3, 2013

(30) Foreign Application Priority Data

Dec. 10, 2010 (EP) .................................. 10015508
Jun. 27, 2011 (EP) .................................. 11005186

(51) Int. Cl.
*C09K 19/54* (2006.01)
*C09K 19/34* (2006.01)
(Continued)

(52) U.S. Cl.
CPC ...... *C09K 19/3483* (2013.01); *C09K 19/3003* (2013.01); *C09K 19/44* (2013.01);
(Continued)

(58) Field of Classification Search
CPC ....................................................... C09K 19/54
See application file for complete search history.

(56) References Cited

U.S. PATENT DOCUMENTS 6,447,644 B1 * 9/2002 Seltzer et al. ................ 162/158
2004/0085490 A1 * 5/2004 Li et al. ......................... 349/56
(Continued)

FOREIGN PATENT DOCUMENTS

| JP | 55023169 A | 2/1980 |
| WO | 2009/129911 A1 | 10/2009 |
| WO | WO 2010072370 A1 * | 7/2010 |

OTHER PUBLICATIONS

International Search Report for PCT/EP2011/005692 (dated Feb. 23, 2012).
(Continued)

*Primary Examiner* — Mark F Huff
*Assistant Examiner* — Anna Malloy
(74) *Attorney, Agent, or Firm* — Millen White Zelano & Branigan, PC

(57) ABSTRACT

The invention relates to a liquid-crystalline medium having a nematic phase and negative dielectric anisotropy which comprises
a) one or more compounds of formula I

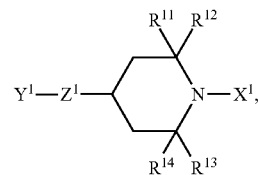

b) one or more compounds of formula II

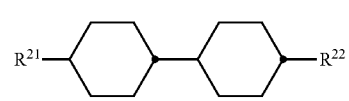

and
c) one or more compounds selected from the compounds of formulae III-1 to III-4

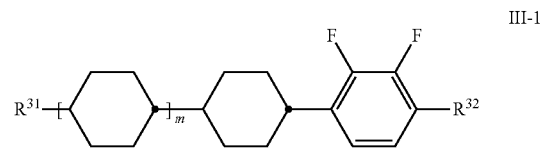

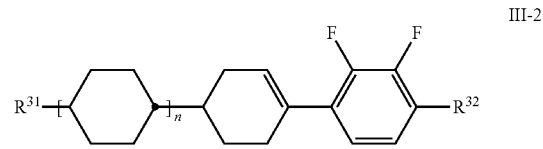

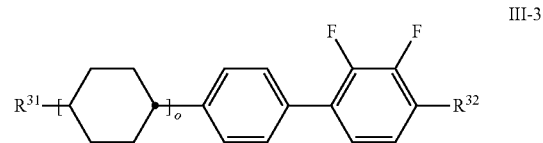

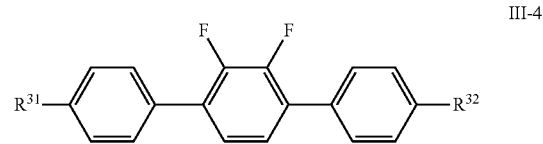

in which the parameters have the meanings indicated herein, to the use thereof in an electro-optical display, particularly in an active-matrix display based on the VA, ECB, PALC, FFS or IPS effect, to displays of this type which contain a liquid-crystalline medium of this type, and to the use of the (Continued)

compounds of the formula I for the stabilisation of a liquid-crystalline medium which comprises one or more compounds of formula II and one or more compounds selected from the compounds of formulae III-1 to III-4.

20 Claims, No Drawings

(51) Int. Cl.
  *C09K 19/30* (2006.01)
  *C09K 19/44* (2006.01)
  *C09K 19/12* (2006.01)
(52) U.S. Cl.
  CPC ........ *C09K 19/54* (2013.01); *C09K 2019/123* (2013.01); *C09K 2019/301* (2013.01); *C09K 2019/3004* (2013.01); *C09K 2019/3009* (2013.01)

(56) References Cited

U.S. PATENT DOCUMENTS

2007/0108411 A1* 5/2007 Saito et al. .............. 252/299.61
2011/0101270 A1  5/2011 Manabe et al.
2011/0248216 A1* 10/2011 Klasen-Memmer et al. ....................... 252/299.62

OTHER PUBLICATIONS

Abstract for JP 55023169 A.
P. Mieville et al., "Scavenging Free Radicals to Preserve Enhancement and Extend Relaxation Times in NMR Using Dynamic Nuclear Polarization", Angew. Chem., vol. 122, No. 35 (Aug. 16, 2010) pp. 6318-6321.
Y. Ohkatsu, "Search for Unified Action Mechanism of Hindered Amine Light Stabilizers", Journal of the Japan Petroleum Institute, vol. 51, No. 4 (2008) pp. 191-204.
Susana Barriga, "2,2,6-6-Tetramethylpiperidin-1-oxyl (TEMPO)", Synlett—Spotlight 28, No. 4, p. 563, (2001).

* cited by examiner

LIQUID-CRYSTALLINE MEDIUM AND ELECTRO-OPTICAL DISPLAY

The present invention relates to liquid-crystal media and to the use thereof in liquid-crystal displays, and to these liquid-crystal displays, particularly liquid-crystal displays which use the ECB (electrically controlled birefringence) effect with dielectrically negative liquid crystals in a homeotropic initial alignment. The liquid-crystal media according to the invention are distinguished by a particularly short response time in the displays according to the invention at the same time as a high voltage holding ratio (VHR for short).

The principle of electrically controlled birefringence, the ECB (electrically controlled birefringence) effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta\varepsilon$ of $\leq -0.5$ in order to be suitable for use for high-information display elements based on the ECB effect. Electro-optical display elements based on the ECB effect have a homeotropic edge alignment (VA technology=vertically aligned). Dielectrically negative liquid-crystal media can also be used in displays which use the so-called IPS effect.

Industrial application of this effect in electro-optical display elements requires LC phases which have to meet a multiplicity of requirements. Particularly important here are chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances, which can be used as LC phases.

Matrix liquid-crystal displays (MLC displays) are known. Non-linear elements which can be used for individual switching of the individual pixels are, for example, active elements (i.e. transistors). The term "active matrix" is then used, where in general use is made of thin-film transistors (TFTs), which are generally arranged on a glass plate as substrate.

A distinction is made between two technologies: TFTs comprising compound semiconductors, such as, for example, CdSe, or TFTs based on polycrystalline and, inter alia, amorphous silicon. The latter technology currently has the greatest commercial importance worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is located opposite each switchable pixel.

The TFT displays most used hitherto usually operate with crossed polarisers in transmission and are backlit. For TV applications, IPS cells or ECB (or VAN) cells are used, whereas monitors usually use IPS cells or TN cells, and notebooks, laptops and mobile applications usually use TN cells.

The term MLC displays here encompasses any matrix display having integrated non-linear elements, i.e., besides the active matrix, also displays with passive elements, such as varistors or diodes (MIM=metal-insulator-metal).

MLC displays of this type are particularly suitable for TV applications, monitors and notebooks or for displays with a high information density, for example in automobile manufacture or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

Displays which use the ECB effect have become established as so-called VAN (vertically aligned nematic) displays, besides IPS (in-plane switching) displays (for example: Yeo, S. D., Paper 15.3: "An LC Display for the TV Application", SID 2004 International Symposium, Digest of Technical Papers, XXXV, Book II, pp. 758 & 759) and the long-known TN (twisted nematic) displays, as one of the three more recent types of liquid-crystal display that are currently the most important, in particular for television applications.

The most important designs that should be mentioned are: MVA (multidomain vertical alignment, for example: Yoshide, H. et al., Paper 3.1: "MVA LCD for Notebook or Mobile PCs . . . . ", SID 2004 International Symposium, Digest of Technical Papers, XXXV, Book I, pp. 6 to 9, and Liu, C. T. et al., Paper 15.1: "A 46-inch TFT-LCD HDTV Technology . . . .", SID 2004 International Symposium, Digest of Technical Papers, XXXV, Book II, pp. 750 to 753), PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book II, pp. 760 to 763) and ASV (advanced super view, for example: Shigeta, Mitzuhiro and Fukuoka, Hirofumi, Paper 15.2: "Development of High Quality LCDTV", SID 2004 International Symposium, Digest of Technical Papers, XXXV, Book II, pp. 754 to 757).

In general form, the technologies are compared, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., Paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular in the switching of grey shades, is still a problem which has not yet been solved to a satisfactory extent.

ECB displays, like ASV displays, use liquid-crystalline media having negative dielectric anisotropy ($\Delta\epsilon$), whereas TN and to date all conventional IPS displays use liquid-crystalline media having positive dielectric anisotropy.

In liquid-crystal displays of this type, the liquid crystals are used as dielectrics, whose optical properties change reversibly on application of an electrical voltage.

Since in displays in general, i.e. also in displays in accordance with these mentioned effects, the operating voltage should be as low as possible, use is made of liquid-crystal media which are generally predominantly composed of liquid-crystal compounds, all of which have the same sign of the dielectric anisotropy and have the highest possible value of the dielectric anisotropy. In general, at most relatively small proportions of neutral compounds and if possible no compounds having a sign of the dielectric anisotropy which is opposite to that of the medium are employed. In the case of liquid-crystal media having negative dielectric anisotropy for ECB displays, predominantly compounds having negative dielectric anisotropy are thus employed. The liquid-crystal media employed generally consist predominantly and usually even essentially of liquid-crystal compounds having negative dielectric anisotropy.

In the media used in accordance with the present application, at most significant amounts of dielectrically neutral liquid-crystal compounds and generally only very small amounts of dielectrically positive compounds or even none at all are typically employed, since in general the liquid-crystal displays are intended to have the lowest possible addressing voltages.

The compound TEMPOL, of the following formula:

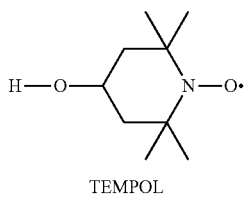

TEMPOL is known and is mentioned, for example, in Mièville, P. et al., Angew. Chem. 2010, 122, pages 6318-6321. It is commercially available from various manufacturers and is employed, for example, as polymerisation inhibitor in formulations for precursors of polyolefins, polystyrenes, polyamides, coatings and PVC and as light or UV stabiliser, in particular in combination with UV absorbers.

Nematic liquid-crystal mixtures having negative dielectric anisotropy which comprise a small amount of TINUVIN®770, a compound of the formula

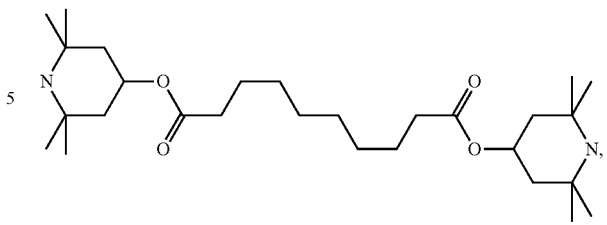

as stabilisers, are proposed, for example, in WO 2009/129911 A1. However, the corresponding liquid-crystal mixtures have inadequate properties for many practical applications. Inter alia, they are not sufficiently stable to irradiation using typical CCFL backlighting.

Similar liquid-crystal mixtures are also known, for example, from EP 2 182 046 A1, WO 2008/009417 A1, WO 2009/021671 A1 and WO 2009/115186 A1. However, the use of stabilisers is not indicated therein.

According to the disclosure therein, these media may optionally also comprise stabilisers of various types, such as, for example, phenols and sterically hindered amines (hindered amine light stabilisers, HALS for short). However, these media are characterised by relatively high threshold voltages and by at best moderate stabilities. In particular, their voltage holding ratio drops after exposure. In addition, a yellowish discoloration often arises.

The use of various stabilisers in liquid-crystalline media is described, for example, in JP (S)55-023169 (A), JP (H)05-117324 (A), WO 02/18515 A1 and JP (H) 09-291282 (A).

Compounds containing a cyclohexylene ring which is axially substituted by halogen (F) are known, inter alia, from DE 197 14 231, DE 187 23 275, DE 198 31 712 and DE 199 45 890. Kirsch, P., Reiffenrath, V. and Bremer, M., Molecular Design and Synthesis, Synlett 1999(4), 389 ff., Kirsch, P. and Tarumi, K., Angew. Chem. Int. Ed., 1997(37), 484 ff. and Kirsch, P., Heckmeier, M. and Tarumi, K., Liquid Crystals, 1999(26), 449 ff., also mention corresponding compounds. However, liquid-crystalline media which comprise compounds of this type are not sufficiently stable, in particular, for many demanding applications. In particular, decomposition may occur at elevated temperatures. However, problems frequently also arise on UV exposure. In particular, an undesired, considerable decrease in the voltage holding ratio (VHR or HR for short) is observed here.

The stabilisation of liquid-crystal mixtures which comprise corresponding compounds by addition of compounds containing a pyridin-5-yl unit is proposed in DE 100 50 880. However, this frequently, as stated below in greater detail, does not result in adequate stability.

The liquid-crystal media of the prior art having correspondingly low addressing voltages have relatively low electrical resistance values or a low VHR and often result in undesired flicker and/or inadequate transmission in the displays. In addition, they are not sufficiently stable to heating and/or UV exposure, at least if they have correspondingly high polarity, as is necessary for low addressing voltages.

In addition, the addressing voltage of the displays of the prior art is often too high, in particular for displays which are not connected directly or not continuously to the power supply network, such as, for example, displays for mobile applications.

In addition, the phase range must be sufficiently broad for the intended application.

The response times of the liquid-crystal media in the displays must be improved, i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications and therefore make it appear desirable to find further optimisation approaches.

Adequate stability of the media to extreme loads, in particular to UV exposure and heating, is very particularly important. In particular in the case of applications in displays in mobile equipment, such as, for example, mobile telephones, this may be crucial.

The disadvantage of the MLC displays disclosed hitherto is due to their comparatively low contrast, the relatively high viewing-angle dependence and the difficulty in producing grey shades in these displays, as well as their inadequate VHR and their inadequate lifetime.

There thus continues to be a great demand for MLC displays having very high specific resistance at the same time as a large working-temperature range, short response times and a low threshold voltage, with the aid of which various grey shades can be produced and which have, in particular, a good and stable VHR.

The invention has the object of providing MLC displays, not only for monitor and TV applications, but also for mobile telephones and navigation systems, which are based on the ECB or IPS effect, do not have the disadvantages indicated above, or only do so to a lesser extent, and at the same time have very high specific resistance values. In particular, it must be ensured for mobile telephones and navigation systems that they also work at extremely high and extremely low temperatures.

Surprisingly, it has been found that it is possible to achieve liquid-crystal displays which have, in particular in ECB displays, a low threshold voltage with short response times and at the same time a sufficiently broad nematic phase, favourable, low birefringence ($\Delta n$), good stability to thermal decomposition and a stable, high VHR if use is made in these display elements of nematic liquid-crystal mixtures which comprise at least one compound of the formula I and in each case at least one compound of the formula II and at least one compound selected from the group of the compounds of the formulae III-1 to III-4.

Media of this type can be used, in particular, for electro-optical displays having active-matrix addressing based on the ECB effect and for IPS (in-plane switching) displays.

The invention thus relates to a liquid-crystalline medium based on a mixture of polar compounds which comprises at least one compound of the formula I and at least one compound which contains a group of the sub-formula II.

The mixtures according to the invention exhibit very broad nematic phase ranges with clearing points≥70° C., very favourable values for the capacitive threshold, relatively high values for the holding ratio and at the same time good low-temperature stabilities at −20° C. and −30° C., as well as very low rotational viscosities. The mixtures according to the invention are furthermore distinguished by a good ratio of clearing point and rotational viscosity and by a high negative dielectric anisotropy.

Surprisingly, it has now been found that it is possible to achieve liquid-crystalline media having a suitably high $\Delta\varepsilon$, a suitable phase range and $\Delta n$ which do not have the disadvantages of the prior-art materials, or at least only do so to a considerably reduced extent.

Surprisingly, it has been found here that the compounds of the formula I result in considerable, in many cases adequate, stabilisation of liquid-crystal mixtures, even to heating. This is the case in most cases in which the parameter $X^1$ in the compounds of the formula I used denotes O*.

However, this is also the case, in particular, if one or more further compounds, preferably phenolic stabilisers, are present. These further compounds are suitable as heat stabilisers. This embodiment is particularly preferred if the parameter $X^1$ in the compounds of the formula I used denotes H.

The invention thus relates to a liquid-crystalline medium having a nematic phase and negative dielectric anisotropy which comprises a) one or more compounds of the formula I, preferably in a concentration in the range from 1 ppm to 1000 ppm, preferably in the range from 50 ppm to 500 ppm, particularly preferably in the range from 150 ppm to 400 ppm,

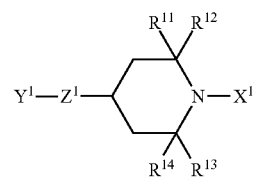

in which
$R^{11}$ to $R^{14}$ each, independently of one another, denote alkyl having 1 to 4 C atoms, preferably all four denote $CH_3$,
$X^1$ denotes H or O* (i.e. a monovalent O atom with a free-radical electron), preferably O*,
$Z^1$ denotes —O—, —(CO)—O—, —O—(CO)—, —O—(CO)—O—, —NH—, —NY$^{01}$— or —NH—(CO)—,
$Y^1$ and $Y^{01}$ each, independently of one another, denote straight-chain or branched alkyl having 1 to 10 C atoms, preferably having 1 to 7 C atoms and particularly preferably having 1 to 5 C atoms, also cycloalkyl, cycloalkylalkyl or alkylcycloalkyl, where one or more —CH$_2$— groups in all these groups may be replaced by —O— in such a way that no two O atoms in the molecule are connected directly to one another,
and, in the case where $Z^1$ denotes —O—(CO)—O—, $Y^1$ may also denote

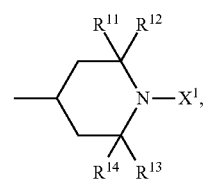

b) one or more compounds of the formula II

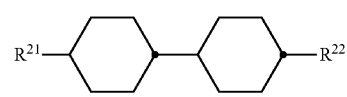

in which
$R^{21}$ denotes an unsubstituted alkyl radical having 1 to 7 C atoms or an unsubstituted alkenyl radical having 2 to 7 C atoms, preferably an n-alkyl radical, particularly preferably having 3, 4 or 5 C atoms, and
$R^{22}$ denotes an unsubstituted alkenyl radical having 2 to 7 C atoms, preferably having 2, 3 or 4 C atoms, more preferably a vinyl radical or a 1-propenyl radical and in particular a vinyl radical,
and
c) one or more compounds selected from the group of the formulae III-1 to III-4

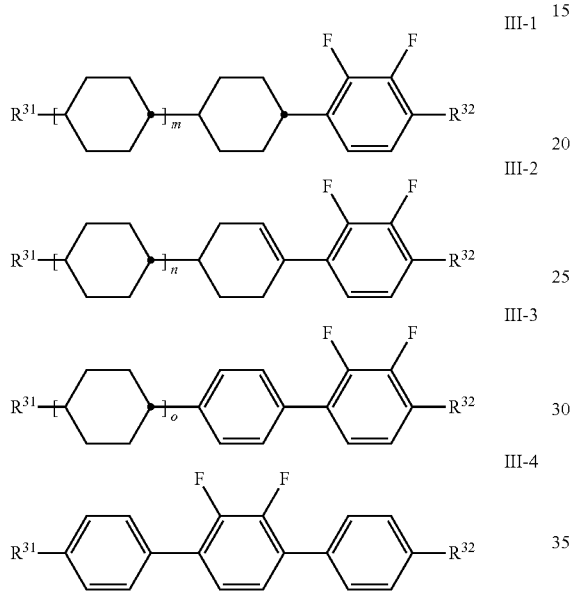

in which
$R^{31}$ denotes an unsubstituted alkyl radical having 1 to 7 C atoms, preferably an n-alkyl radical, particularly preferably having 2 to 5 C atoms,
$R^{32}$ denotes an unsubstituted alkyl radical having 1 to 7 C atoms, preferably having 2 to 5 C atoms, or an unsubstituted alkoxy radical having 1 to 6 C atoms, preferably having 2, 3 or 4 C atoms, and
m, n and o each, independently of one another, denote 0 or 1.

In the present application,
alkyl particularly preferably denotes straight-chain alkyl, in particular $CH_3$—, $C_2H_5$—, n-$C_3H_7$—, n-$C_4H_9$— or n-$C_5H_{11}$—, and
alkenyl particularly preferably denotes $CH_2$=CH—, E-$CH_3$—CH=CH—, $CH_2$=CH—$CH_2$—$CH_2$—, E-$CH_3$—CH=CH—$CH_2$—$CH_2$— or E-(n-$C_3H_7$)—CH=CH—.

The liquid-crystalline media in accordance with the present application preferably comprise in total 1 ppm to 1000 ppm, preferably 50 ppm to 500 ppm and very particularly preferably 150 ppm to 400 ppm, of compounds of the formula I.

The concentration of the compounds of the formula I in the media according to the invention is preferably 300 ppm or less, particularly preferably 200 ppm or less. The concentration of the compounds of the formula I in the media according to the invention is very particularly preferably 50 ppm or more to 100 ppm or less.

These compounds are highly suitable as stabilisers in liquid-crystal mixtures. In particular, they stabilise the "voltage holding ratio" (VHR or only HR for short) of the mixtures after UV exposure.

In a preferred embodiment of the present invention, the media according to the invention in each case comprise one or more compounds of the formula I selected from the group of the compounds of the formulae I-1 to I-7, preferably of the formulae I-1 and/or I-2:

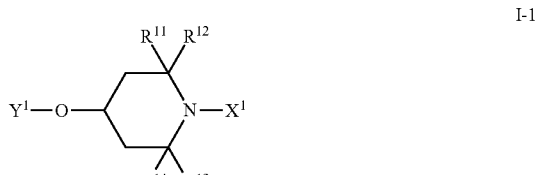

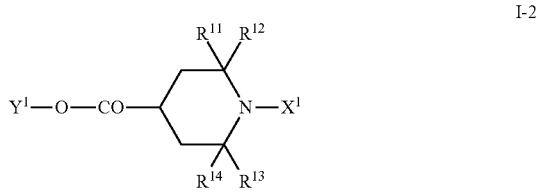

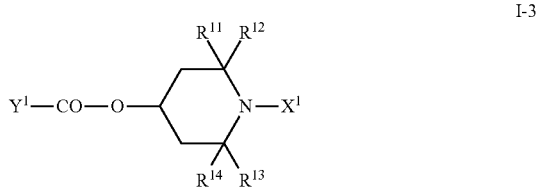

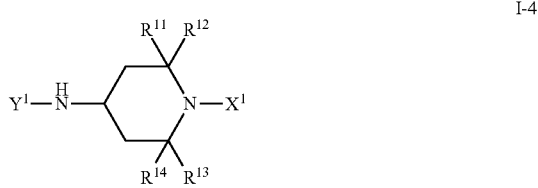

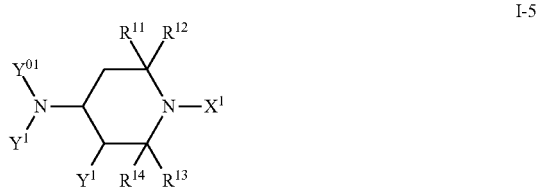

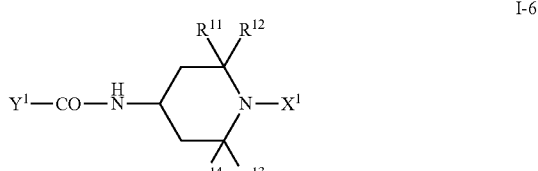

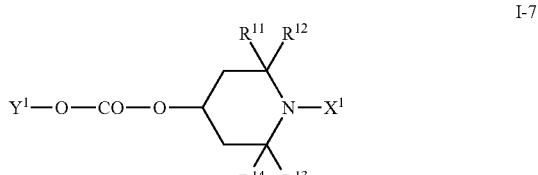

in which the parameters have the meanings indicated above under formula I.

In a more preferred embodiment of the present invention, the media according to the invention in each case comprise one or more compounds selected from the group of the following compounds:

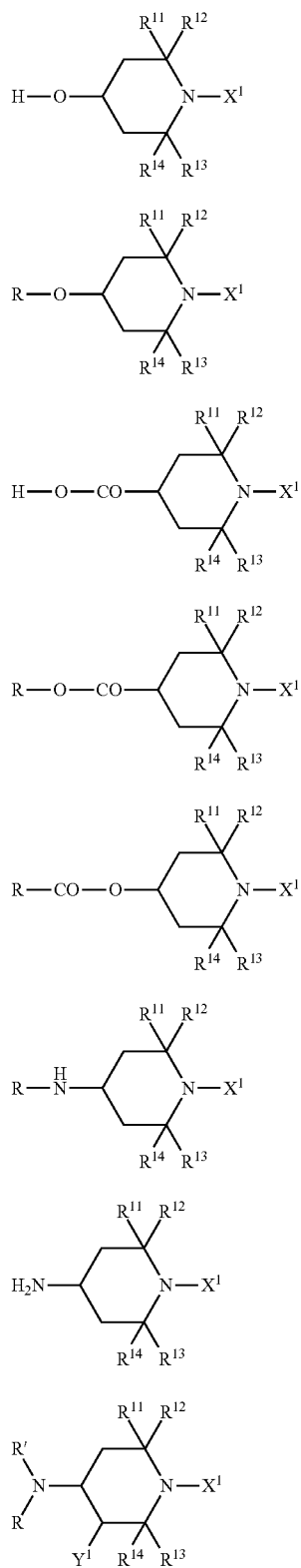
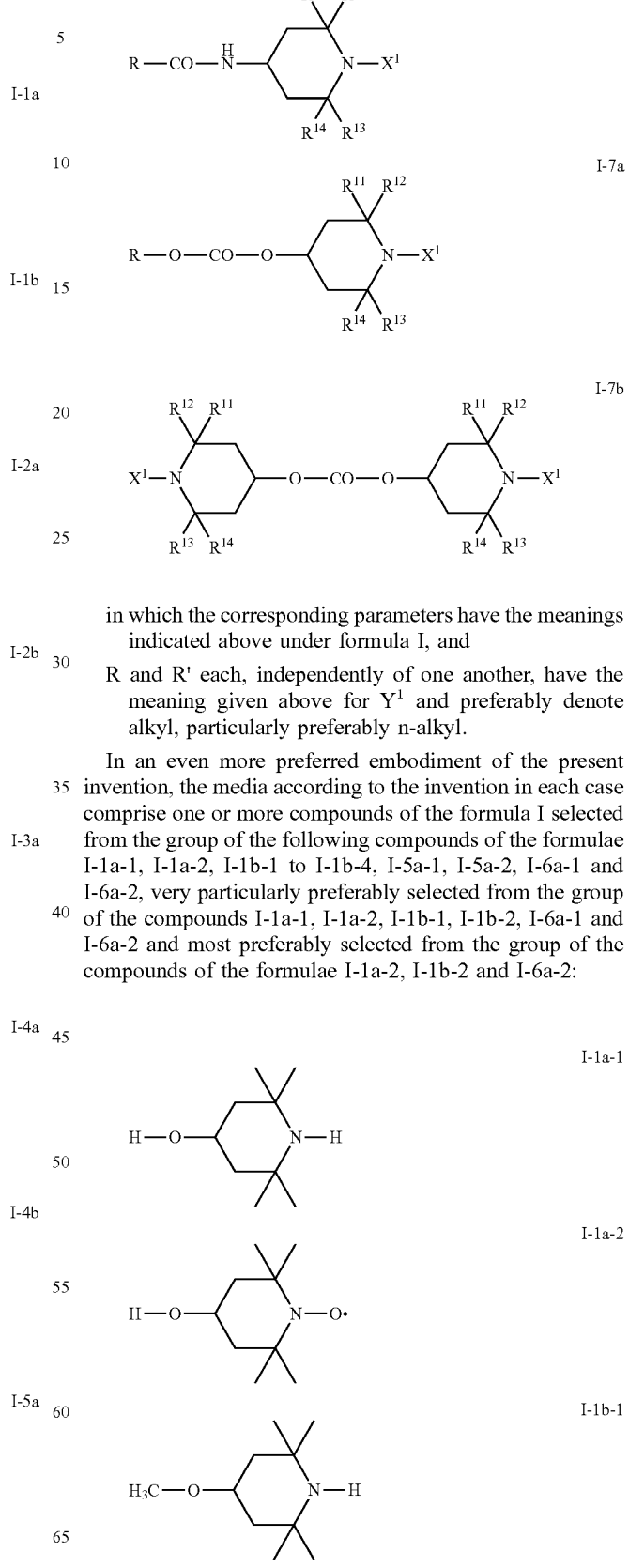

in which the corresponding parameters have the meanings indicated above under formula I, and R and R' each, independently of one another, have the meaning given above for $Y^1$ and preferably denote alkyl, particularly preferably n-alkyl.

In an even more preferred embodiment of the present invention, the media according to the invention in each case comprise one or more compounds of the formula I selected from the group of the following compounds of the formulae I-1a-1, I-1a-2, I-1b-1 to I-1b-4, I-5a-1, I-5a-2, I-6a-1 and I-6a-2, very particularly preferably selected from the group of the compounds I-1a-1, I-1a-2, I-1b-1, I-1b-2, I-6a-1 and I-6a-2 and most preferably selected from the group of the compounds of the formulae I-1a-2, I-1b-2 and I-6a-2:

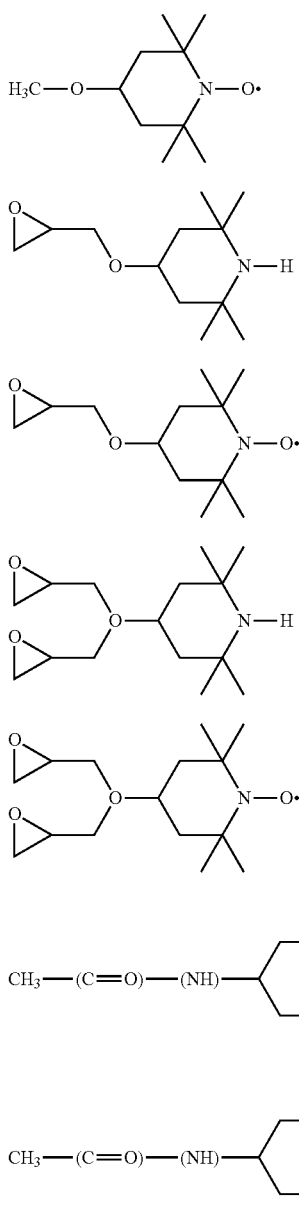

In addition to the compounds of the formula I or preferred sub-formulae thereof, the media in accordance with the present invention preferably comprise one or more dielectrically negative compounds of the formula II in a total concentration in the range from 5% or more to 90% or less, preferably from 10% or more to 80% or less, particularly preferably from 20% or more to 70% or less.

The medium according to the invention preferably comprises one or more compounds selected from the group of the formulae III-1 to III-4 in a total concentration in the range from 10% or more to 80% or less, preferably from 15% or more to 70% or less, particularly preferably from 20% or more to 60% or less.

The medium according to the invention particularly preferably comprises one or more compounds of the formula III-1 in a total concentration in the range from 5% or more to 30% or less, one or more compounds of the formula III-2 in a total concentration in the range from 3% or more to 30% or less, one or more compounds of the formula III-3 in a total concentration in the range from 5% or more to 30% or less, one or more compounds of the formula III-4 in a total concentration in the range from 1% or more to 30% or less.

Preferred compounds of the formula II are the compounds selected from the group of the compounds of the formulae II-1 and II-2, preferably selected from the compounds of the formula II-1,

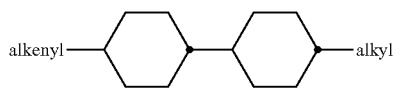

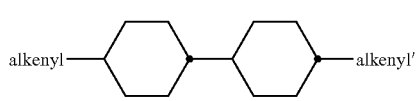

in which alkyl denotes an alkyl radical having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms.

The media according to the invention preferably comprise one or more compounds of the formula III-1, preferably one or more compounds selected from the group of the compounds of the formulae III-1-1 and III-1-2,

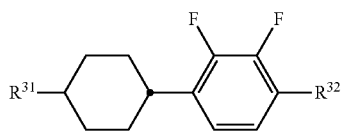

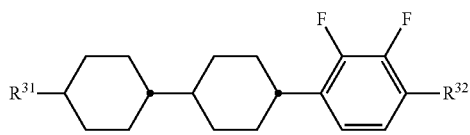

in which the parameters have the meanings given above for formula III-1, and preferably $R^{31}$ denotes an alkyl radical having 2 to 5 C atoms, preferably having 3 to 5 C atoms, and $R^{32}$ denotes an alkyl or alkoxy radical having 2 to 5 C atoms, preferably an alkoxy radical having 2 to 4 C atoms, or an alkenyloxy radical having 2 to 4 C atoms.

The media according to the invention preferably comprise one or more compounds of the formula III-2, preferably one or more compounds selected from the group of the compounds of the formulae III-2-1 and III-2-2,

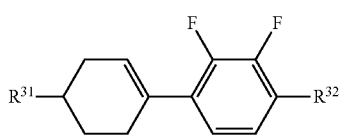
III-2-1

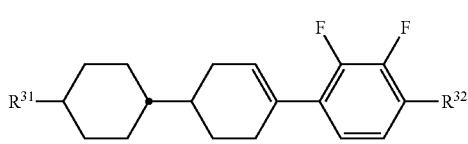
III-2-2 in which the parameters have the meanings given above for formula III-2, and preferably $R^{31}$ denotes an alkyl radical having 2 to 5 C atoms, preferably having 3 to 5 C atoms, and $R^{32}$ denotes an alkyl or alkoxy radical having 2 to 5 C atoms, preferably an alkoxy radical having 2 to 4 C atoms, or an alkenyloxy radical having 2 to 4 C atoms.

The media according to the invention preferably comprise one or more compounds of the formula III-3, preferably one or more compounds selected from the group of the compounds of the formulae III-3-1 and III-3-2,

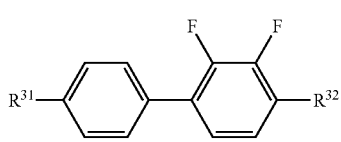
III-3-1

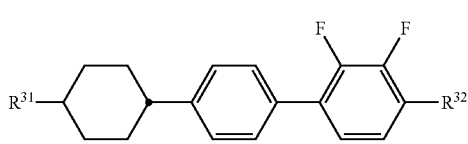
III-3-2 in which the parameters have the meanings given above for formula III-3, and preferably $R^{31}$ denotes an alkyl radical having 2 to 5 C atoms, preferably having 3 to 5 C atoms, and $R^{32}$ denotes an alkyl or alkoxy radical having 2 to 5 C atoms, preferably an alkoxy radical having 2 to 4 C atoms, or an alkenyloxy radical having 2 to 4 C atoms.

The media according to the invention very preferably comprise one or more compounds of the formula II selected from the group of the compounds of the formulae II-1a, II-1b, II-2a and II-2b, II-3a to II-5a, II-5b, II-6a, II-6b, II-7a and II-7b, preferably selected from the group of the compounds of the formulae II-3a, II-3b and II-3c, and very particularly preferably of the formula II-3a,
and optionally
one or more chiral compounds.

The media according to the invention preferably comprise the following compounds in the total concentrations stated:
- 10-60% by weight of one or more compounds of the formula III and/or
- 30-80% by weight of one or more compounds of the formulae IV and/or V,
where the total content of all compounds in the medium is 100%.

The media according to the invention particularly preferably comprise one or more compounds selected from the group of the compounds of the formulae OH-1 to OH-6,

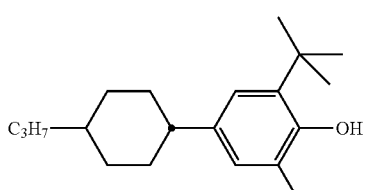
OH-1

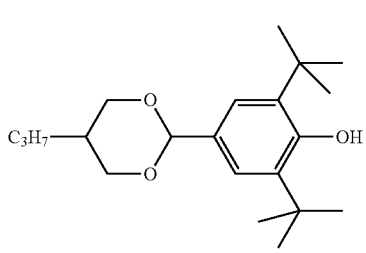
OH-2

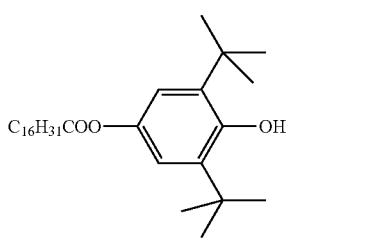
OH-3

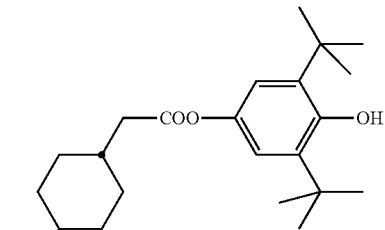
OH-4

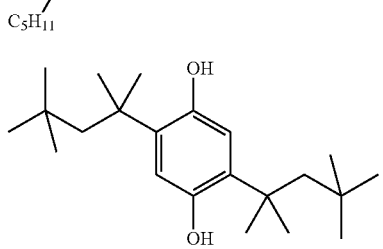
OH-5

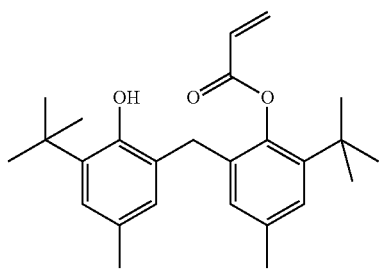
OH-6

These compounds are highly suitable for the heat stabilisation of the media.

The present invention also relates to electro-optical displays or electro-optical components which contain liquid-crystalline media according to the invention. Preference is given to electro-optical displays which are based on the VA or ECB effect and in particular those which are addressed by means of an active-matrix addressing device.

Accordingly, the present invention likewise relates to the use of a liquid-crystalline medium according to the invention in an electro-optical display or in an electro-optical component, and to a process for the preparation of the liquid-crystalline media according to the invention, characterised in that one or more compounds of the formula I are mixed with one or more compounds which contain one or more groups of the sub-formula II, preferably with one or more compounds of the formula II, with one or more further compounds, preferably selected from the group of the compounds of the formulae III and IV and/or V.

In addition, the present invention relates to a process for the stabilisation of a liquid-crystalline medium which comprises one or more compounds of the formula II and one or more compounds selected from the group of the compounds of the formulae III-1 to III-4, characterised in that one or more compounds of the formula I are added to the medium.

In a further preferred embodiment, the medium comprises one or more compounds of the formula IV

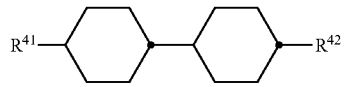

IV in which
$R^{41}$ denotes alkyl having 1 to 7 C atoms, preferably having 2 to 5 C atoms, and
$R^{42}$ denotes alkyl having 1 to 7 C atoms or alkoxy having 1 to 6 C atoms, preferably having 2 to 5 C atoms.

In a further preferred embodiment, the medium comprises one or more compounds of the formula IV, selected from the group of the compounds of the formulae IV-1 and IV-2,

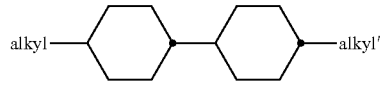

IV-1

IV-2 in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and In a further preferred embodiment, the medium comprises one or more compounds of the formula V in which
$R^{51}$ and $R^{52}$, independently of one another, have one of the meanings given for $R^{21}$ and $R^{22}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

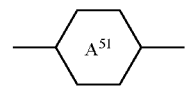

to

, if present, each, independently of one another, denote

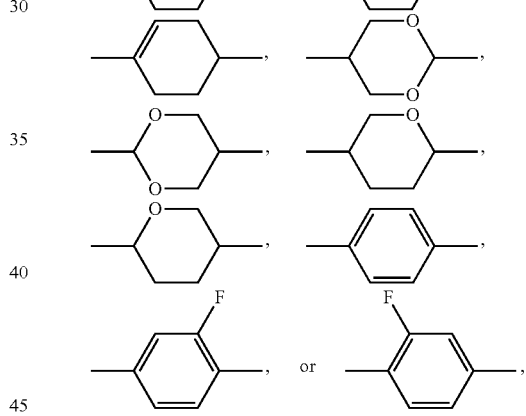

preferably

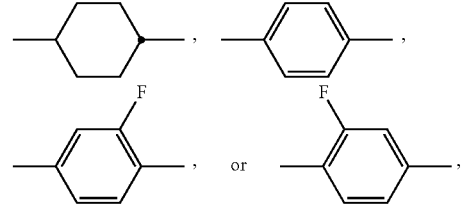

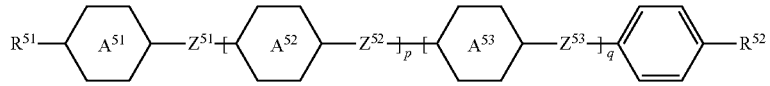

V preferably

denotes

, and, if present,

preferably denotes

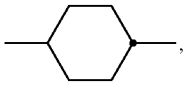, $Z^{51}$ to $Z^{53}$ each, independently of one another, denote —CH$_2$—CH$_2$—, —CH$_2$—O—, —CH═CH—, —C≡C—, —COO— or a single bond, preferably —CH$_2$—CH$_2$—, —CH$_2$—O— or a single bond and particularly preferably a single bond, p and q each, independently of one another, denote 0 or 1, (p+q) preferably denotes 0 or 1.

In a further preferred embodiment, the medium comprises one or more compounds of the formula V selected from the group of the compounds of the formulae V-1 to V-10, preferably selected from the group of the compounds of the formulae V-1 to V-5,

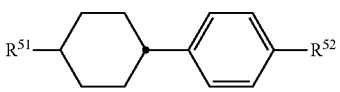 V-1

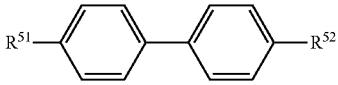 V-2

 V-3

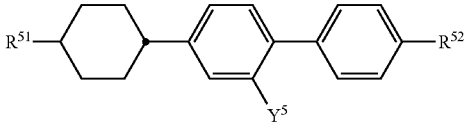 V-4

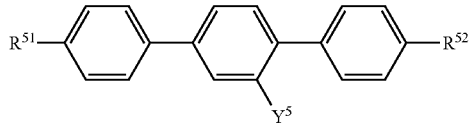 V-5

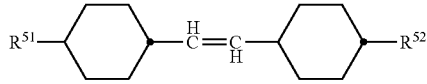 V-6

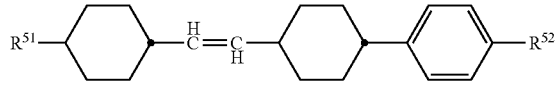 V-7

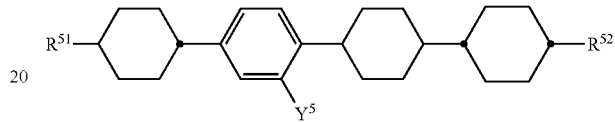 V-8

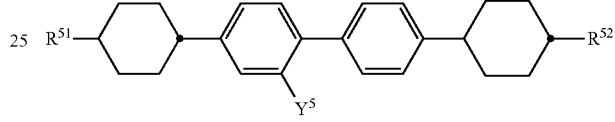 V-9

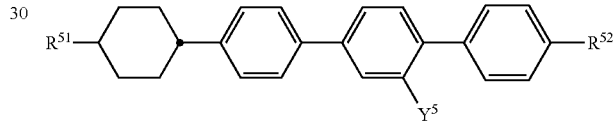 V-10 in which the parameters have the meanings given above under formula V, and $Y^5$ denotes H or F, and preferably $R^{51}$ denotes alkyl having 1 to 7 C atoms or alkenyl having 2 to 7 C atoms, and $R^{52}$ denotes alkyl having 1 to 7 C atoms, alkenyl having 2 to 7 C atoms or alkoxy having 1 to 6 C atoms, preferably alkyl or alkenyl, particularly preferably alkenyl.

In a further preferred embodiment, the medium comprises one or more compounds of the formula V-1 selected from the group of the compounds of the formulae V-1a and V-1b, preferably of the formula V-1b,

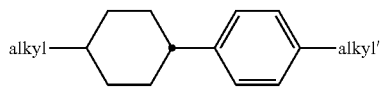 V-1a

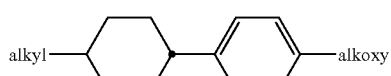 V-1b in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms.

In a further preferred embodiment, the medium comprises one or more compounds of the formula V-3 selected from the group of the compounds of the formulae V-3a and V-3b,

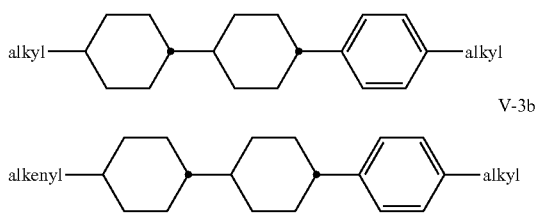

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula V-4 selected from the group of the compounds of the formulae V-4a and V-4-b,

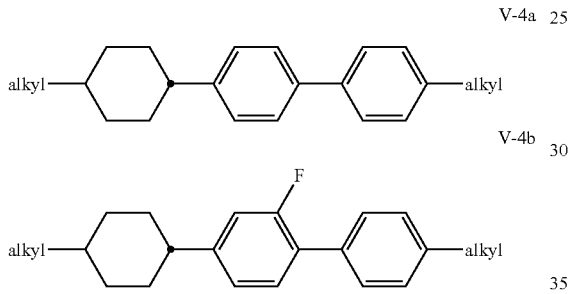

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and In a further preferred embodiment, the medium comprises one or more compounds of the formula III-4, preferably of the formula III-4-a,

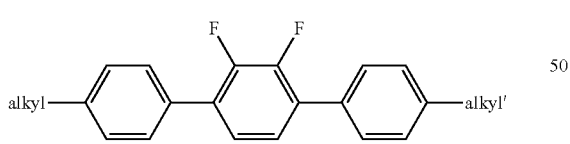

in which
alkyl and alkyl', independently of one another, denote alkyl having 1 to 7 C atoms, preferably having 2 to 5 C atoms.

The liquid-crystal media in accordance with the present invention may comprise one or more chiral compounds.

Particularly preferred embodiments of the present invention meet one or more of the following conditions, where the acronyms (abbreviations) are explained in Tables A to C and illustrated by examples in Table D.

i. The liquid-crystalline medium has a birefringence of 0.060 or more, particularly preferably 0.070 or more.
ii. The liquid-crystalline medium has a birefringence of 0.130 or less, particularly preferably 0.120 or less.
iii. The liquid-crystalline medium has a birefringence in the range from 0.090 or more to 0.120 or less.
iv. The liquid-crystalline medium has a negative dielectric anisotropy having a value of 2.0 or more, particularly preferably 3.0 or more.
v. The liquid-crystalline medium has a negative dielectric anisotropy having a value of 5.5 or less, particularly preferably 4.0 or less.
vi. The liquid-crystalline medium has a negative dielectric anisotropy having a value in the range from 2.5 or more to 3.8 or less.
vii. The liquid-crystalline medium comprises one or more particularly preferred compounds of the formula II selected from the sub-formulae given below:

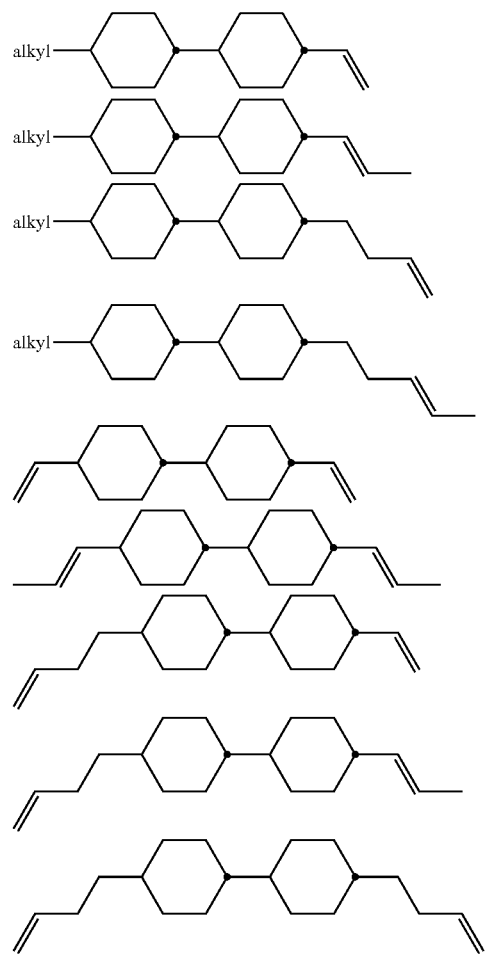

in which alkyl has the meaning given above and preferably, in each case independently of one another, denotes alkyl having 1 to 6, preferably having 2 to 5, C atoms and particularly preferably n-alkyl.

viii. The total concentration of the compounds of the formula II in the mixture as a whole is 25% or more, preferably 30% or more, and is preferably in the range from 25% or more to 49% or less, particularly preferably in the range from 29% or more to 47% or less, and very particularly preferably in the range from 37% or more to 44% or less.

ix. The liquid-crystalline medium comprises one or more compounds of the formula II selected from the group of the compounds of the following formulae: CC-n-V and/or CC-n-Vm, particularly preferably CC-3-V, preferably in a concentration of up to 50% or less, particularly preferably up to 42% or less, and optionally additionally CC-3-V1, preferably in a concentration of up to 15% or less, and/or CC-4-V, preferably in a concentration of up to 20% or less, particularly preferably up to 10% or less.

x. The total concentration of the compounds of the formula CC-3-V in the mixture as a whole is 20% or more, preferably 25% or more.

xi. The proportion of compounds of the formulae III-1 to III-4 in the mixture as a whole is 50% or more and preferably 75% or less.

xii. The liquid-crystalline medium essentially consists of compounds of the formulae I, II, III-1 to III-4, IV and V, preferably of compounds of the formulae I, II and III-1 to III-4.

xiii. The liquid-crystalline medium comprises one or more compounds of the formula IV, preferably in a total concentration of 5% or more, in particular 10% or more, and very particularly preferably 15% or more to 40% or less.

The invention furthermore relates to an electro-optical display having active-matrix addressing based on the VA or ECB effect, characterised in that it contains, as dielectric, a liquid-crystalline medium in accordance with the present invention.

The liquid-crystal mixture preferably has a nematic phase range having a width of at least 80 degrees and a flow viscosity $v_{20}$ of at most 30 mm$^2$·s$^{-1}$ at 20° C.

The liquid-crystal mixture according to the invention has a $\Delta\in$ of −0.5 to −8.0, in particular −1.5 to −6.0, and very particularly preferably −2.0 to −5.0, where $\Delta\in$ denotes the dielectric anisotropy.

The rotational viscosity $\gamma_1$ is preferably 120 mPa·s or less, in particular 100 mPa·s or less.

The mixtures according to the invention are suitable for all VA-TFT applications, such as, for example, VAN, MVA, (S)-PVA and ASV. They are furthermore suitable for IPS (in-plane switching), FFS (fringe-field switching) and PALC applications having negative $\Delta\in$.

The nematic liquid-crystal mixtures in the displays according to the invention generally comprise two components A and B, which themselves consist of one or more individual compounds.

The liquid-crystalline media according to the invention preferably comprise 4 to 15, in particular 5 to 12, and particularly preferably 10 or less, compounds. These are preferably selected from the group of the compounds of the formulae I, II and III-1 to III-4, and/or IV and/or V.

The liquid-crystalline media according to the invention may optionally also comprise more than 18 compounds. In this case, they preferably comprise 18 to 25 compounds.

Besides compounds of the formulae I to V, other constituents may also be present, for example in an amount of up to 45%, but preferably up to 35%, in particular up to 10%, of the mixture as a whole.

The media according to the invention may optionally also comprise a dielectrically positive component, whose total concentration is preferably 10% or less, based on the entire medium.

In a preferred embodiment, the liquid-crystal media according to the invention comprise in total, based on the mixture as a whole, 10 ppm or more to 1000 ppm or less, preferably 50 ppm or more to 500 ppm or less, particularly preferably 100 ppm or more to 400 ppm or less and very particularly preferably 150 ppm or more to 300 ppm or less, of the compound of the formula I, 20% or more to 60% or less, preferably 25% or more to 50% or less, particularly preferably 30% or more to 45% or less, of compounds of the formula II, and 50% or more to 70% or less of compounds of the formulae III-1 to III-4.

In a preferred embodiment, the liquid-crystal media according to the invention comprise compounds selected from the group of the compounds of the formulae I, II, III-1 to III-4, IV and V, preferably selected from the group of the compounds of the formulae I, II and III-1 to III-4; they preferably consist predominantly, particularly preferably essentially and very particularly preferably virtually completely of the compounds of the said formulae.

The liquid-crystal media according to the invention preferably have a nematic phase from in each case at least −20° C. or less to 70° C. or more, particularly preferably from −30° C. or less to 80° C. or more, very particularly preferably from −40° C. or less to 85° C. or more and most preferably from −40° C. or less to 90° C. or more.

The expression "have a nematic phase" here means on the one hand that no smectic phase and no crystallisation are observed at low temperatures at the corresponding temperature and on the other hand that no clearing occurs on heating out of the nematic phase. The investigation at low temperatures is carried out in a flow viscometer at the corresponding temperature and checked by storage in test cells having a cell thickness corresponding to the electro-optical application for at least 100 hours. If the storage stability at a temperature of −20° C. in a corresponding test cell is 1000 h or more, the medium is regarded as stable at this temperature. At temperatures of −30° C. and −40° C., the corresponding times are 500 h and 250 h respectively. At high temperatures, the clearing point is measured in capillaries by conventional methods.

In a preferred embodiment, the liquid-crystal media according to the invention are characterised by optical anisotropy values in the moderate to low range. The birefringence values are preferably in the range from 0.065 or more to 0.130 or less, particularly preferably in the range from 0.080 or more to 0.120 or less and very particularly preferably in the range from 0.085 or more to 0.110 or less.

In this embodiment, the liquid-crystal media according to the invention have negative dielectric anisotropy and relatively high absolute values of the dielectric anisotropy ($|\Delta\in|$) which are preferably in the range from 2.7 or more to 5.3 or less, preferably to 4.5 or less, preferably from 2.9 or more to 4.5 or less, particularly preferably from 3.0 or more to 4.0 or less and very particularly preferably from 3.5 or more to 3.9 or less.

The liquid-crystal media according to the invention have relatively low values for the threshold voltage ($V_0$) in the range from 1.7 V or more to 2.5 V or less, preferably from 1.8 V or more to 2.4 V or less, particularly preferably from 1.9 V or more to 2.3 V or less and very particularly preferably from 1.95 V or more to 2.1 V or less.

In a further preferred embodiment, the liquid-crystal media according to the invention preferably have relatively low values of the average dielectric anisotropy ($\in_{av.} \equiv (\in_{\|} + 2\in_{\perp})/3$) which are preferably in the range from 5.0 or more to 7.0 or less, preferably from 5.5 or more to 6.5 or less, still more preferably from 5.7 or more to 6.4 or less, particularly preferably from 5.8 or more to 6.2 or less and very particularly preferably from 5.9 or more to 6.1 or less.

In addition, the liquid-crystal media according to the invention have high values for the VHR in liquid-crystal cells.

In freshly filled cells at 20° C. in the cells, these are greater than or equal to 95%, preferably greater than or equal to 97%, particularly preferably greater than or equal to 98% and very particularly preferably greater than or equal to 99%, and after 5 minutes in the oven at 100° C. in the cells, these are greater than or equal to 90%, preferably greater than or equal to 93%, particularly preferably greater than or equal to 96% and very particularly preferably greater than or equal to 98%.

In general, liquid-crystal media having a low addressing voltage or threshold voltage here have a lower VHR than those having a higher addressing voltage or threshold voltage, and vice versa.

These preferred values for the individual physical properties are preferably also in each case maintained by the media according to the invention in combination with one another.

In the present application, the term "compounds", also written as "compound(s)", means both one and also a plurality of compounds, unless explicitly indicated otherwise.

Unless indicated otherwise, the individual compounds are generally employed in the mixtures in concentrations in each case from 1% or more to 30% or less, preferably from 2% or more to 30% or less and particularly preferably from 3% or more to 16% or less.

In a preferred embodiment, the liquid-crystalline media according to the invention comprise
the compound of the formula I,
one or more compounds of the formula II, preferably selected from the group of the compounds of the formulae CC-n-V and CC-n-Vm, preferably CC-3-V, CC-3-V1, CC-4-V and CC-5-V, particularly preferably selected from the group of the compounds CC-3-V, CC-3-V1 and CC-4-V, very particularly preferably the compound CC-3-V, and optionally additionally the compound(s) CC-4-V and/or CC-3-V1,
one or more compounds of the formula III-1-1, preferably of the formula CY-n-Om, selected from the group of the compounds of the formulae CY-3-O2, CY-3-O4, CY-5-O2 and CY-5-O4,
one or more compounds of the formula III-1-2, preferably selected from the group of the compounds of the formulae CCY-n-m and CCY-n-Om, preferably of the formula CCY-n-Om, preferably selected from the group of the compounds of the formulae CCY-3-O2, CCY-2-O2, CCY-3-O1, CCY-3-O3, CCY-4-O2, CCY-3-O2 and CCY-5-O2,
optionally, preferably obligatorily, one or more compounds of the formula III-2-2, preferably of the formula CLY-n-Om, preferably selected from the group of the compounds of the formulae CLY-2-O4, CLY-3-O2, CLY-3-O3,
one or more compounds of the formula III-3-2, preferably of the formula CPY-n-Om, preferably selected from the group of the compounds of the formulae CPY-2-O2 and CPY-3-O2, CPY-4-O2 and CPY-5-O2,
one or more compounds of the formula III-4, preferably of the formula PYP-n-m, preferably selected from the group of the compounds of the formulae PYP-2-3 and PYP-2-4.

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "virtually completely consist of": the concentration of the constituents in question in the composition is preferably 98% or more, particularly preferably 99% or more and very particularly preferably 100.0%.

This applies both to the media as compositions with their constituents, which can be components and compounds, and also to the components with their constituents, the compounds. Only in relation to the concentration of an individual compound relative to the medium as a whole does the term comprise mean: the concentration of the compound in question is preferably 1% or more, particularly preferably 2% or more, very particularly preferably 4% or more.

For the present invention, "≤" means less than or equal to, preferably less than, and "≥" means greater than or equal to, preferably greater than.

For the present invention,

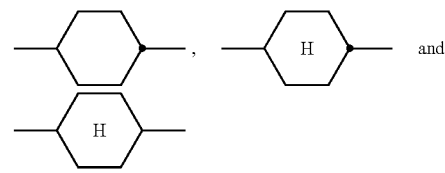

denote trans-1,4-cyclohexylene, and

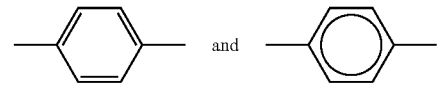

denote 1,4-phenylene.

For the present invention, the expression "dielectrically positive compounds" means compounds having a Δε of >1.5, the expression "dielectrically neutral compounds" means those where −1.5≤Δε≤1.5 and the expression "dielectrically negative compounds" means those where Δε<−1.5. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilisers and/or pleochroic dyes and/or chiral dopants in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

In a preferred embodiment, the liquid-crystal media according to the invention comprise a polymer precursor which comprises one or more reactive compounds, preferably reactive mesogens, and, if necessary, also further additives, such as, for example, polymerisation initiators and/or polymerisation moderators, in the usual amounts. The amount of these additives employed is in total 0% or more to 10% or less, based on the amount of the entire mixture, preferably 0.1% or more to 2% or less. The concentration of these and similar additives is not taken into account when specifying the concentrations and concentration ranges of the liquid-crystal compounds in the liquid-crystal media.

The compositions consist of a plurality of compounds, preferably 3 or more to 30 or fewer, particularly preferably 6 or more to 20 or fewer and very particularly preferably 10 or more to 16 or fewer compounds, which are mixed in a conventional manner. In general, the desired amount of the components used in lesser amount is dissolved in the components making up the principal constituent of the mixture. This is advantageously carried out at elevated temperature. If the selected temperature is above the clearing point of the principal constituent, completion of the dissolution operation is particularly easy to observe. However, it is also possible to prepare the liquid-crystal mixtures in other conventional ways, for example using pre-mixes or from a so-called "multibottle system".

The mixtures according to the invention exhibit very broad nematic phase ranges having clearing points of 65° C. or more, very favourable values for the capacitive threshold, relatively high values for the holding ratio and at the same time very good low-temperature stabilities at −30° C. and −40° C. Furthermore, the mixtures according to the invention are distinguished by low rotational viscosities $\gamma_1$.

It goes without saying to the person skilled in the art that the media according to the invention for use in VA, IPS, FFS or PALC displays may also comprise compounds in which, for example, H, N, O, Cl, F have been replaced by the corresponding isotopes.

The structure of the liquid-crystal displays according to the invention corresponds to the usual geometry, as described, for example, in EP-A 0 240 379.

The liquid-crystal phases according to the invention can be modified by means of suitable additives in such a way that they can be employed in any type of, for example, ECB, VAN, IPS, GH or ASM-VA LCD display that has been disclosed to date.

Table E below indicates possible dopants which can be added to the mixtures according to the invention. If the mixtures comprise one or more dopants, it is (they are) employed in amounts of 0.01 to 4%, preferably 0.1 to 1.0%.

Stabilisers which can be added, for example, to the mixtures according to the invention, preferably in amounts of 0.01 to 6%, in particular 0.1 to 3%, are shown below in Table F.

For the purposes of the present invention, all concentrations are, unless explicitly noted otherwise, indicated in percent by weight and relate to the corresponding mixture or mixture component, unless explicitly indicated otherwise.

All temperature values indicated in the present application, such as, for example, the melting point T(C,N), the smectic (S) to nematic (N) phase transition T(S,N) and the clearing point T(N,I), are indicated in degrees Celsius (° C.) and all temperature differences are correspondingly indicated in differential degrees (° or degrees), unless explicitly indicated otherwise.

For the present invention, the term "threshold voltage" relates to the capacitive threshold ($V_0$), also known as the Freedericks threshold, unless explicitly indicated otherwise.

All physical properties are and have been determined in accordance with "Merck Liquid Crystals, Physical Properties of Liquid Crystals", status November 1997, Merck KGaA, Germany, and apply for a temperature of 20° C., and $\Delta n$ is determined at 589 nm and $\Delta\in$ at 1 kHz, unless explicitly indicated otherwise in each case.

The electro-optical properties, for example the threshold voltage ($V_0$) (capacitive measurement), are, as is the switching behaviour, determined in test cells produced at Merck Japan Ltd. The measurement cells have soda-lime glass substrates and are constructed in an ECB or VA configuration with polyimide alignment layers (SE-1211 with diluent **26 (mixing ratio 1:1), both from Nissan Chemicals, Japan), which have been rubbed perpendicularly to one another and effect homeotropic alignment of the liquid crystals. The surface area of the transparent, virtually square ITO electrodes is 1 cm$^2$.

Unless indicated otherwise, a chiral dopant is not added to the liquid-crystal mixtures used, but the latter are also particularly suitable for applications in which doping of this type is necessary.

The VHR is determined in test cells produced at Merck Japan Ltd. The measurement cells have soda-lime glass substrates and are constructed with polyimide alignment layers (AL-3046 from Japan Synthetic Rubber, Japan) with a layer thickness of 50 nm, which have been rubbed perpendicularly to one another. The layer thickness is a uniform 6.0 μm. The surface area of the transparent ITO electrodes is 1 cm$^2$.

The VHR is determined at 20° C. (VHR$_{20}$) and after 5 minutes in an oven at 100° C. (VHR$_{100}$) in a commercially available instrument from Autronic Melchers, Germany. The voltage used has a frequency of 60 Hz.

The accuracy of the VHR measurement values depends on the respective value of the VHR. The accuracy decreases with decreasing values. The deviations generally observed in the case of values in the various magnitude ranges are compiled in their order of magnitude in the following table.

| VHR range VHR values | | Deviation |
|---|---|---|
| from | to | (relative)/% |
| 99.6% | 100% | +/−0.1 |
| 99.0% | 99.6% | +/−0.2 |

-continued

| VHR range VHR values | | Deviation |
|---|---|---|
| from | to | (relative)/% |
| 98% | 99% | +/−0.3 |
| 95% | 98% | +/−0.5 |
| 90% | 95% | +/−1 |
| 80% | 95% | +/−2 |
| 60% | 80% | +/−4 |
| 40% | 60% | +/−8 |
| 20% | 40% | +/−10 |
| 10% | 20% | +/−20 |

The stability to UV irradiation is investigated in a "Suntest CPS", a commercial instrument from Heraeus, Germany. The sealed test cells are irradiated for 2.0 hours without additional heating. The irradiation power in the wavelength range from 300 nm to 800 nm is 765 W/m² V. A UV "cut-off" filter having an edge wavelength of 310 nm is used in order to simulate the so-called window glass mode. In each series of experiments, at least four test cells are investigated for each condition, and the respective results are indicated as averages of the corresponding individual measurements.

The decrease in the voltage holding ratio (ΔVHR) usually caused by the exposure, for example by UV irradiation by LCD backlighting, is determined in accordance with the following equation (1):

$$\Delta VHR(t) = VHR(t) - VHR(t=0) \quad (1).$$

The relative stability ($S_{rel}$) of an LC mixture to a load for a time t is determined in accordance with the following equation, equation (2):

$$S_{rel}(t) = \frac{VHRref(t=0) - VHRref(t)}{VHR(t=0) - VHR(t)}, \quad (2)$$

where "ref" stands for the corresponding unstabilised mixture.

A further characteristic quantity which, besides the VHR, can characterise the conductivity of the liquid-crystal mixtures is the ion density. High values of the ion density often result in the occurrence of display faults, such as image sticking and flickering. The ion density is preferably determined in test cells produced at Merck Japan Ltd. The test cells have substrates made from soda-lime glass and are designed with polyimide alignment layers (AL-3046 from Japan Synthetic Rubber, Japan) having a polyimide layer thickness of 40 nm. The layer thickness of the liquid-crystal mixture is a uniform 5.8 μm. The area of the circular, transparent ITO electrodes, which are additionally fitted with a guard ring, is 1 cm². The accuracy of the measurement method is about ±15%. The cells are dried overnight in an oven at 120° C. before filling with the relevant liquid-crystal mixture.

The ion density is measured using a commercially available instrument from TOYO, Japan. The measurement method is essentially a measurement method, which is analogous to cyclic voltammetry, as described in M. Inoue, "Recent Measurement of Liquid Crystal Material Characteristics", Proceedings IDW 2006, LCT-7-1,647. In this method, an applied direct voltage is varied between a positive and negative maximum value in accordance with a prespecified triangular profile. A complete run through the profile thus forms one measurement cycle. If the applied voltage is sufficiently large that the ions in the field are able to move to the respective electrode, an ion current forms due to discharge of the ions. The amount of charge transferred here is typically in the range from a few pC to a few nC. This makes highly sensitive detection necessary, which is ensured by the above-mentioned instrument. The results are depicted in a current/voltage curve. The ion current here is evident from the occurrence of a peak at voltages which are smaller than the threshold voltage of the liquid-crystal mixture. Integration of the peak area gives the value for the ion density of the mixture investigated. Four test cells are measured per mixture. The repetition frequency of the triangular voltage is 0.033 Hz, the measurement temperature is 60° C., the maximum voltage is ±3 V to ±10 V, depending on the magnitude of the dielectric anisotropy of the relevant mixture.

The rotational viscosity is determined using the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (v) are 21 mm²·s⁻¹, 14 mm²·s⁻¹ and 27 mm²·s⁻¹ respectively.

The following symbols are used, unless explicitly indicated otherwise:

$V_0$ threshold voltage, capacitive [V] at 20° C.,
$n_e$ extraordinary refractive index measured at 20° C. and 589 nm,
$n_o$ ordinary refractive index measured at 20° C. and 589 nm,
Δn optical anisotropy measured at 20° C. and 589 nm,
$\epsilon_\perp$ dielectric susceptibility perpendicular to the director at 20° C. and 1 kHz,
$\epsilon_\parallel$ dielectric susceptibility parallel to the director at 20° C. and 1 kHz,
Δϵ dielectric anisotropy at 20° C. and 1 kHz,
cl.p. or
T(N,I) clearing point [° C.],
v flow viscosity measured at 20° C. [mm²·s⁻¹],
$\gamma_1$ rotational viscosity measured at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN], and
LTS low-temperature stability of the phase, determined in test cells,
VHR voltage holding ratio,
ΔVHR decrease in the voltage holding ratio,
$S_{rel}$ relative stability of the VHR.

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | | | | |
|---|---|---|---|---|
| C | (cyclohexane) | | | |
| D | (1,3-dioxane) | Dl | (1,3-dioxane isomer) | |
| A | (tetrahydropyran) | Al | (tetrahydropyran isomer) | |
| P | (phenyl) | | | |
| G | (fluorophenyl) | Gl | (fluorophenyl isomer) | |
| U | (difluorophenyl) | Ul | (difluorophenyl isomer) | |
| Y | (difluorophenyl) | | | |
| P(F, Cl)Y | (fluoro-chlorophenyl) | P(Cl, F)Y | (chloro-fluorophenyl) | |
| np | (naphthalene) | | | |
| n3f | (trifluoronaphthalene) | nN3fl | (trifluoronaphthalene isomer) | |
| th | (tetralin) | thl | (tetralin isomer) | |

TABLE A-continued

Ring elements

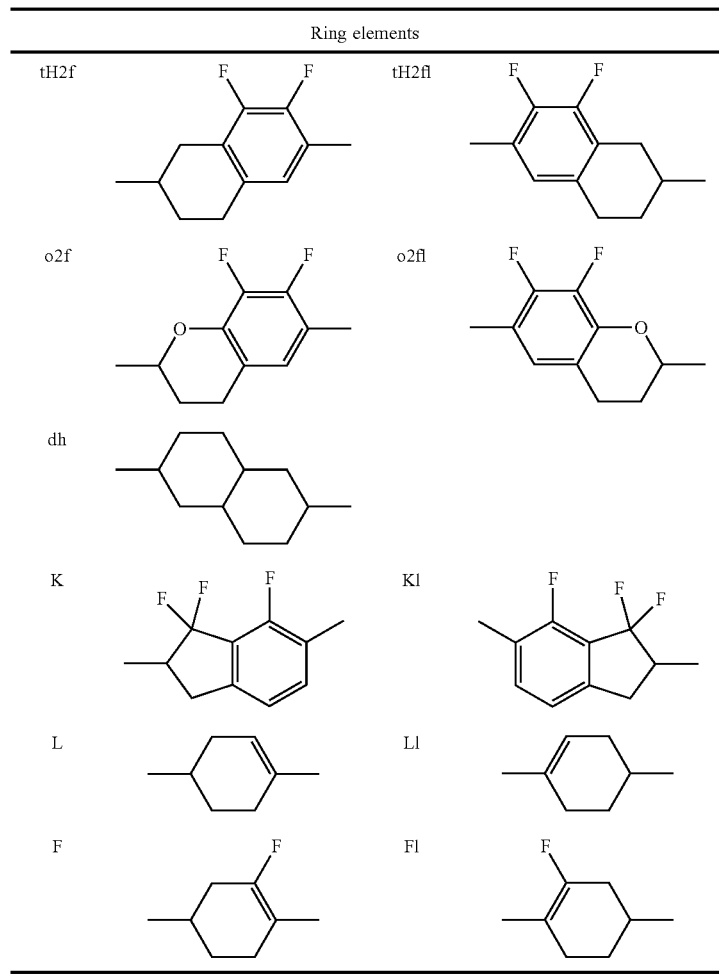

TABLE B

Bridging units

| | |
|---|---|
| E | —CH$_2$—CH$_2$— |
| V | —CH=CH— |
| T | —C≡C— |
| W | —CF$_2$—CF$_2$— |
| B | —CF=CF— |

TABLE B-continued

Bridging units

| | | | |
|---|---|---|---|
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End groups

| On the left individually or in combination | | On the right individually or in combination | |
|---|---|---|---|
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |

TABLE C-continued

| End groups | | | |
|---|---|---|---|
| -DO- | $CF_2HO-$ | -OD | $-OCF_2H$ |
| -TO- | $CF_3O-$ | -OT | $-OCF_3$ |
| -A- | $H-C\equiv C-$ | -A | $-C\equiv C-H$ |
| -nA- | $C_nH_{2n+1}-C\equiv C-$ | -An | $-C\equiv C-C_nH_{2n+1}$ |
| -NA- | $N\equiv C-C\equiv C-$ | -AN | $-C\equiv C-C\equiv N$ |

| On the left only in combination | | On the right only in combination | |
|---|---|---|---|
| -...n...- | $-C_nH_{2n}-$ | -...n... | $-C_nH_{2n}-$ |
| -...M...- | $-CFH-$ | -...M... | $-CFH-$ |
| -...D...- | $-CF_2-$ | -...D... | $-CF_2-$ |
| -...V...- | $-CH=CH-$ | -...V... | $-CH=CH-$ |
| -...Z...- | $-CO-O-$ | -...Z... | $-CO-O-$ |
| -...ZI...- | $-O-CO-$ | -...ZI... | $-O-CO-$ |
| -...K...- | $-CO-$ | -...K... | $-CO-$ |
| -...W...- | $-CF=CF-$ | -...W... | $-CF=CF-$ | in which n and m are each integers, and the three dots "..." are place-holders for other abbreviations from this table.

Besides the compounds of the formula I, the mixtures according to the invention preferably comprise one or more compounds of the compounds mentioned below.

The following abbreviations are used:
(n, m and z are, independently of one another, each an integer, preferably 1 to 6)

TABLE D

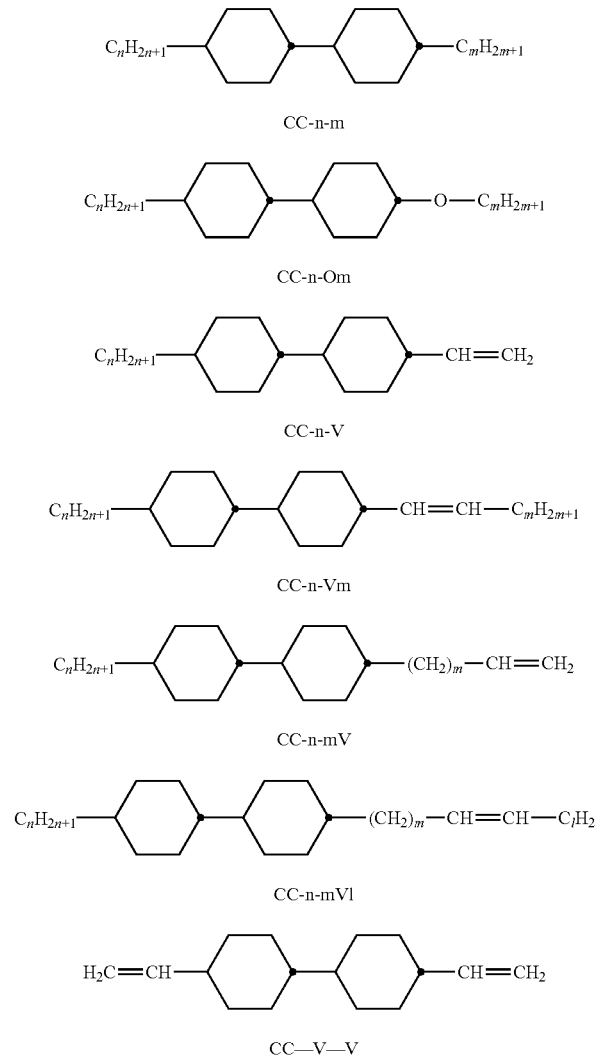

CC-n-m

CC-n-Om

CC-n-V

CC-n-Vm

CC-n-mV

CC-n-mVl

CC—V—V

TABLE D-continued
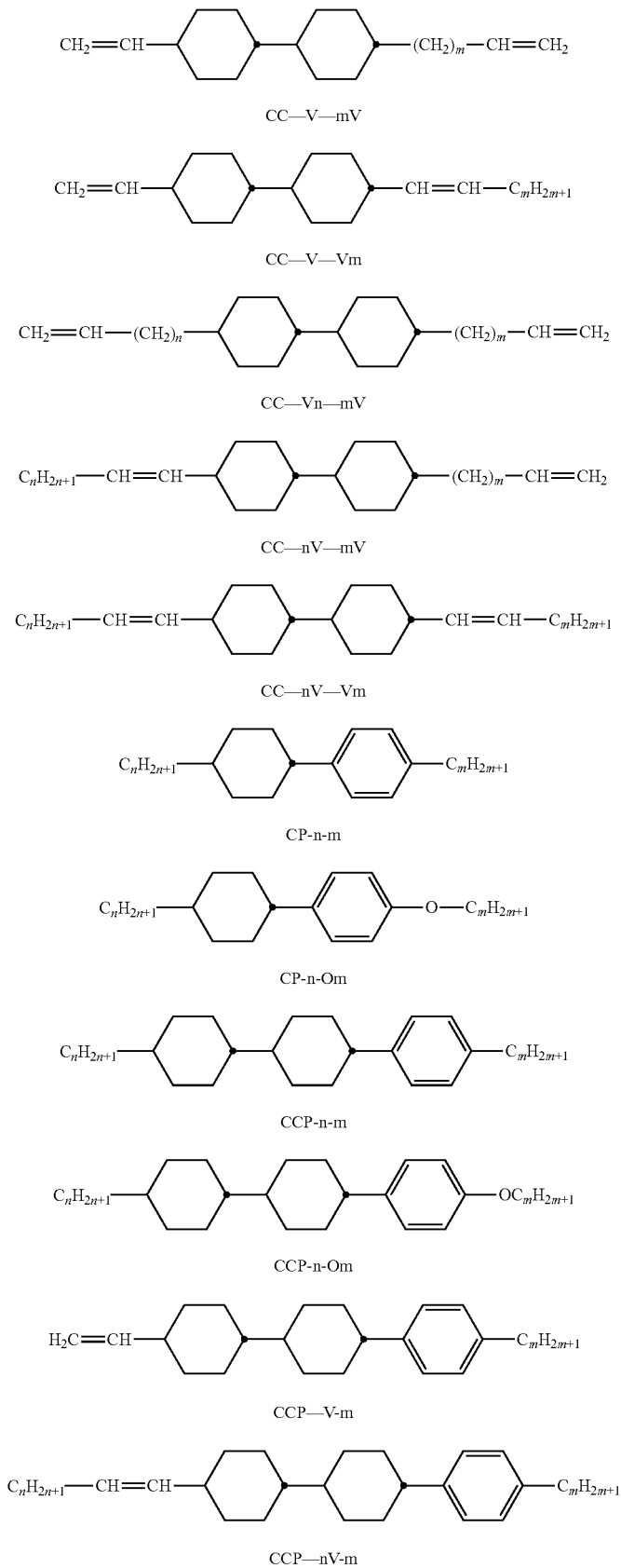

TABLE D-continued
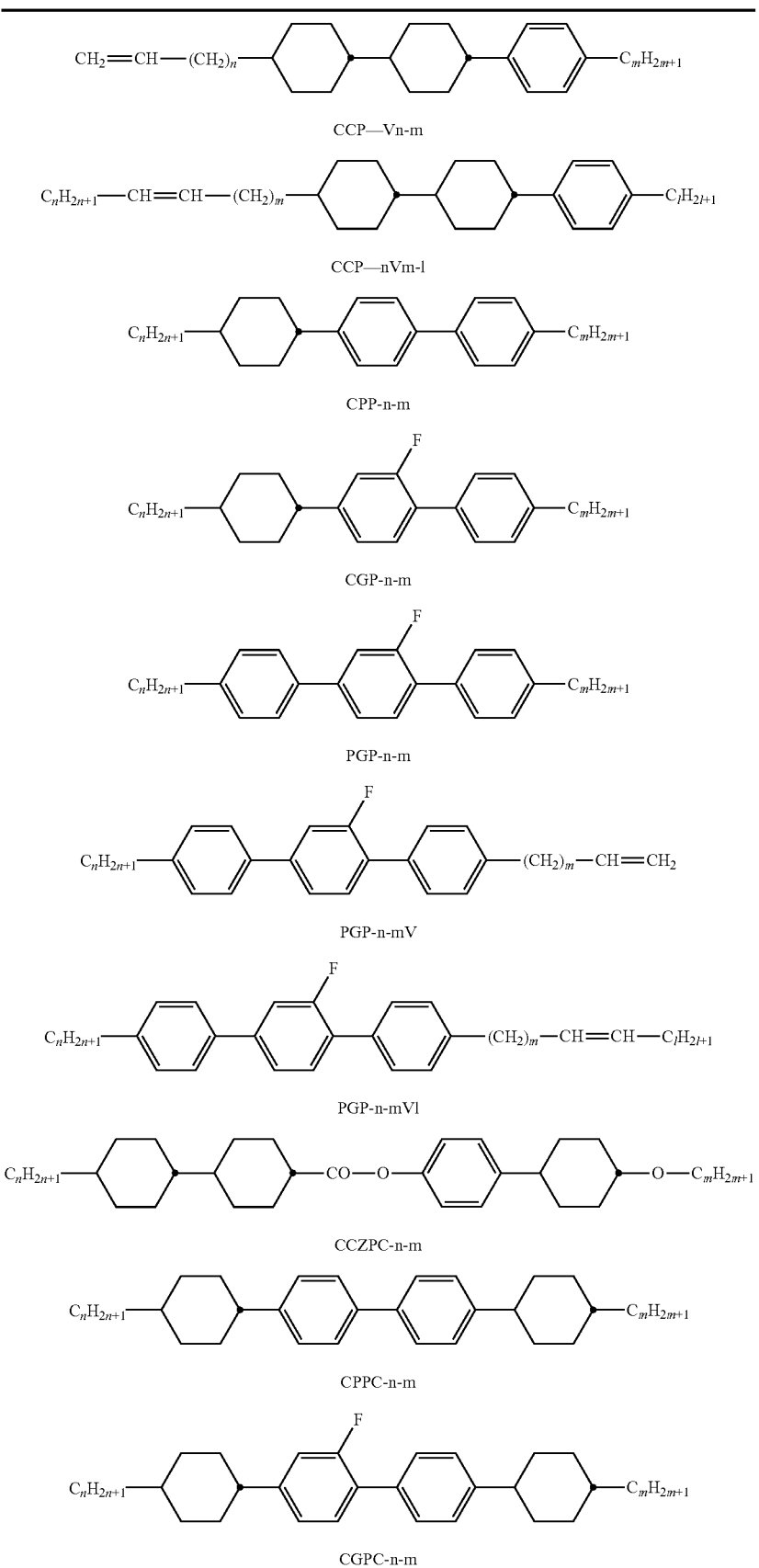

TABLE D-continued
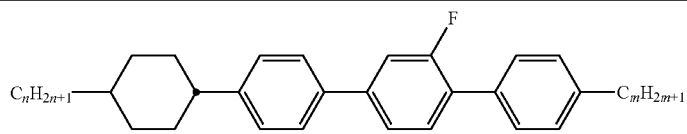
CPGP-n-m
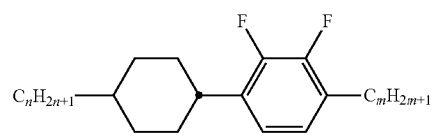
CY-n-m
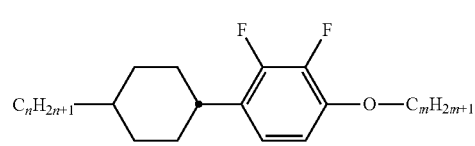
CY-n-Om
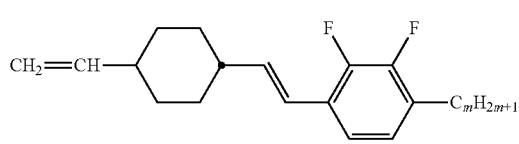
CVY-n-m
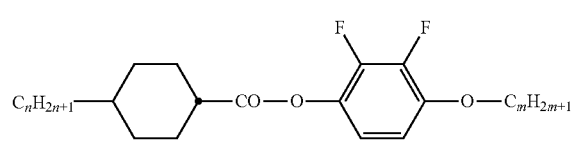
CZY-n-Om
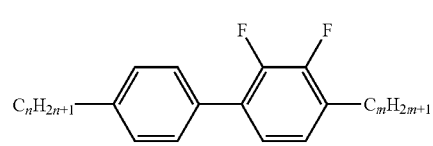
PY-n-m
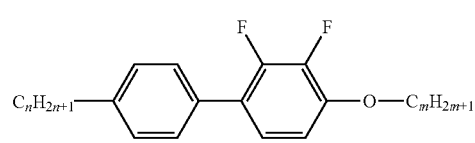
PY-n-Om
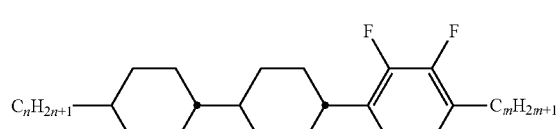
CCY-n-m
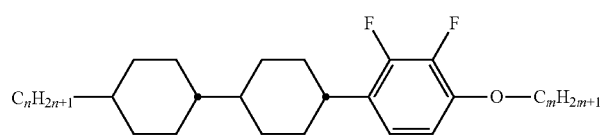
CCY-n-Om TABLE D-continued
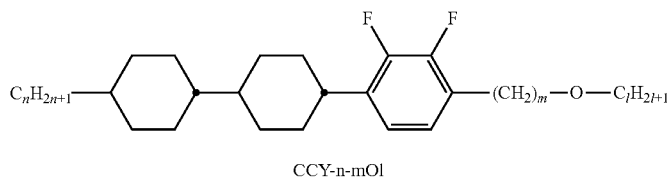
CCY-n-mOl
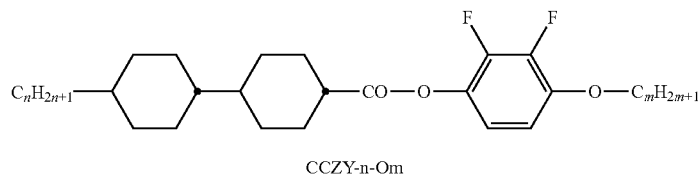
CCZY-n-Om
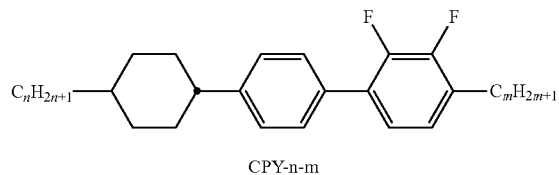
CPY-n-m
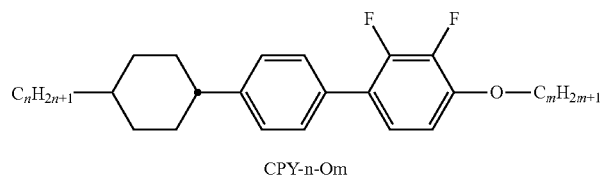
CPY-n-Om
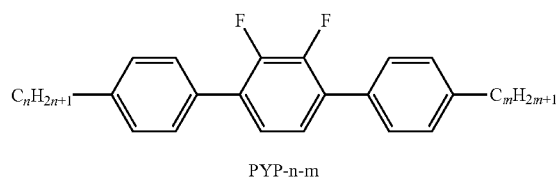
PYP-n-m
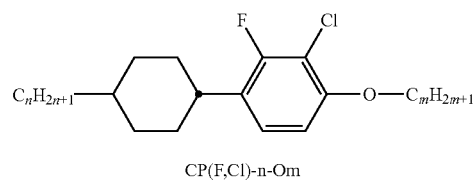
CP(F,Cl)-n-Om
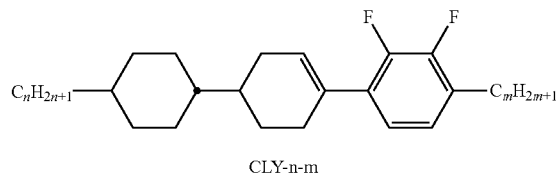
CLY-n-m
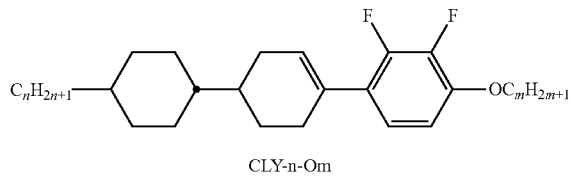
CLY-n-Om TABLE D-continued
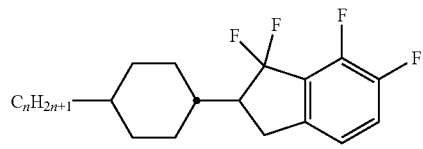
CK-n-F
Table E shows chiral dopants which are preferably employed in the mixtures according to the invention.
TABLE E
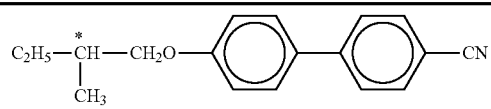
C 15
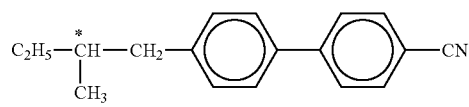
CB 15
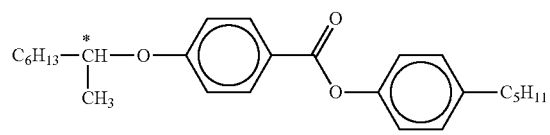
CM 21
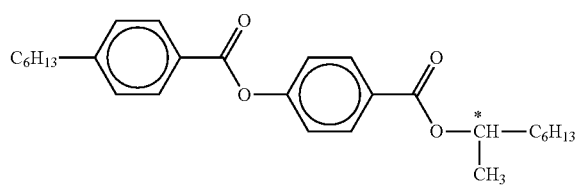
R S-811/S-811
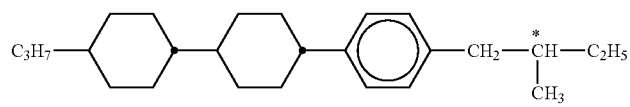
CM 44
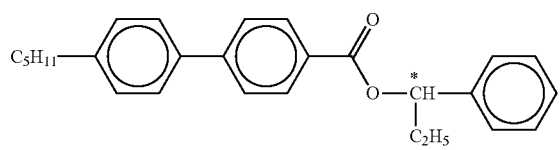
CM 45
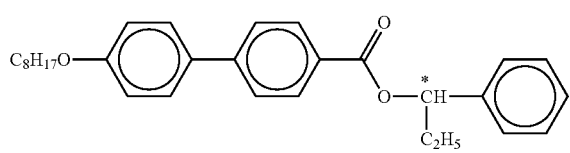
CM 47

TABLE E-continued
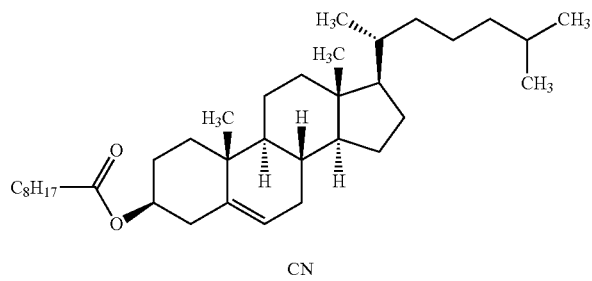
CN
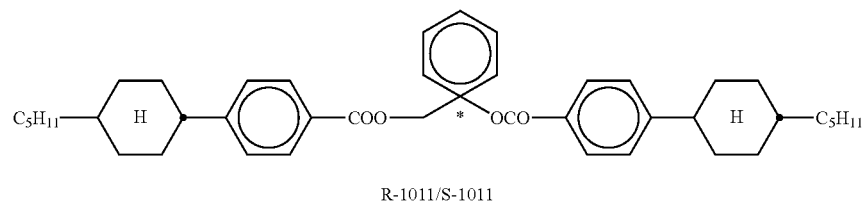
R-1011/S-1011
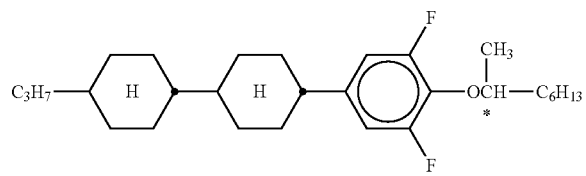
R-2011/S-2011
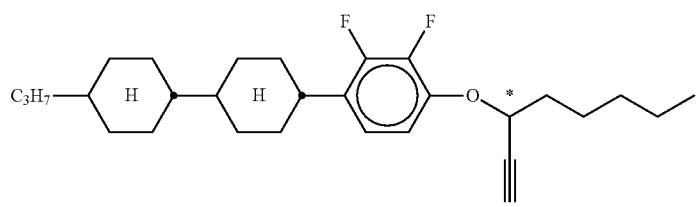
R-3011/S-3011
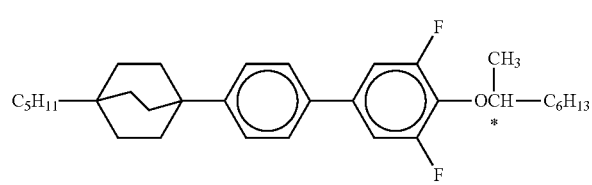
R-4011/S-4011

TABLE E-continued

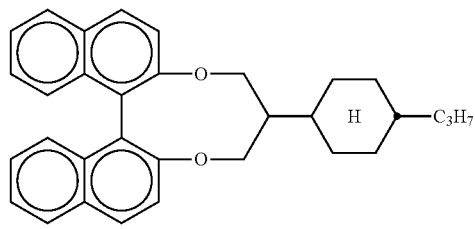

R-5011/S-5011

In a preferred embodiment of the present invention, the media according to the invention comprise one or more compounds selected from the group of the compounds from Table E.

Table F shows stabilisers which can preferably be employed in the mixtures according to the invention in addition to the compounds of the formula I. The parameter n here denotes an integer in the range from 1 to 12. In particular, the phenol derivatives shown can be employed as additional stabilisers since they act as antioxidants.

TABLE F

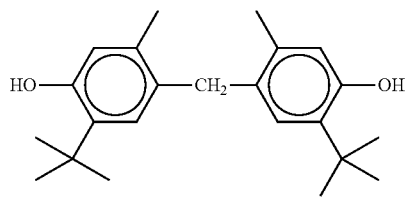

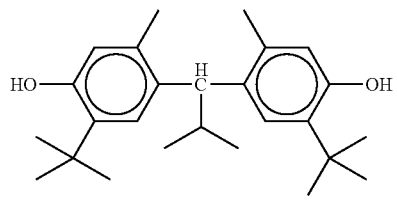

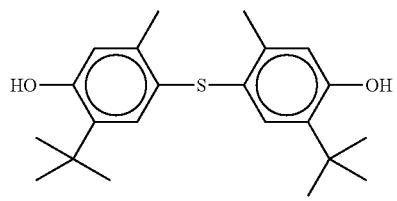

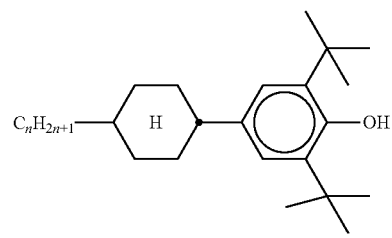

TABLE F-continued
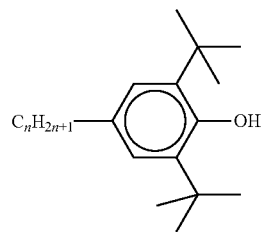
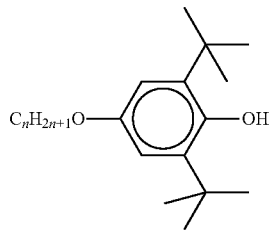
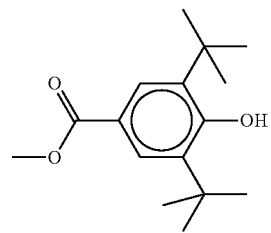
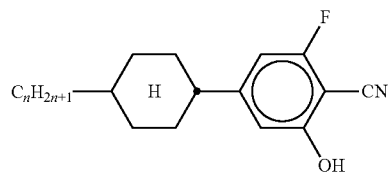
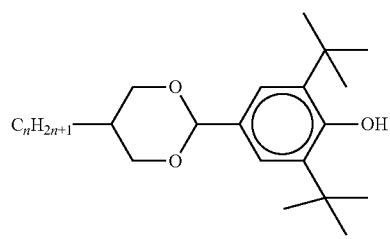
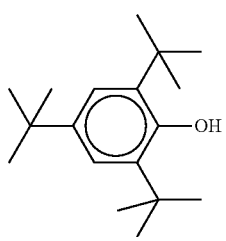
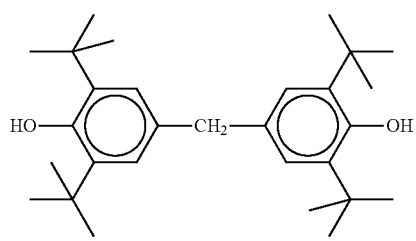

TABLE F-continued
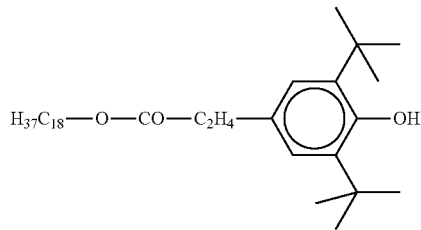
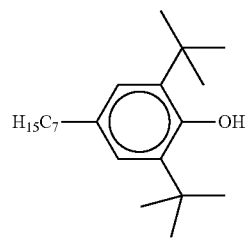
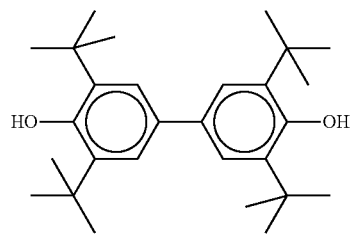
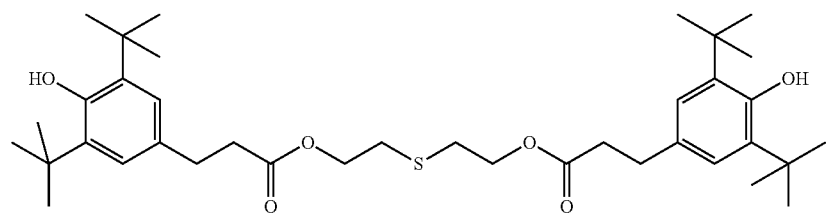 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
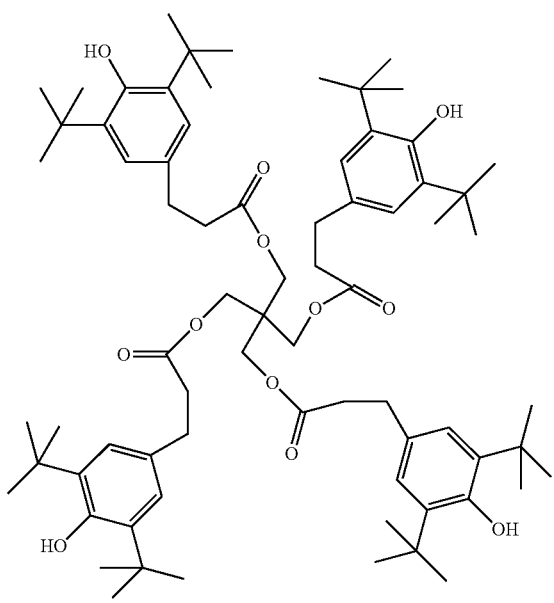 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE F-continued
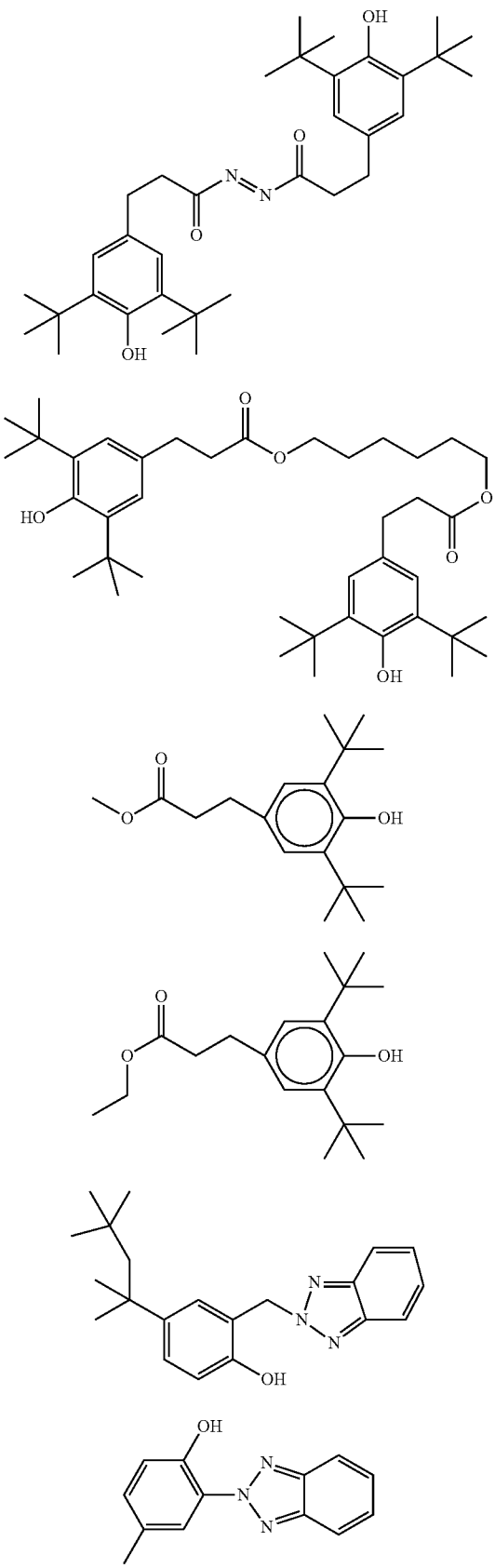

TABLE F-continued
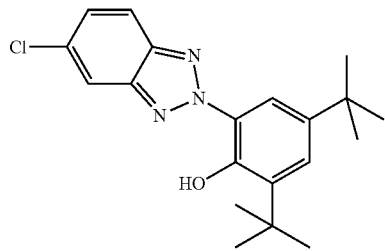 [SMILES: CC(C)(C)c1cc(-n2nc3ccc(Cl)cc3n2)c(O)c(C(C)(C)C)c1]
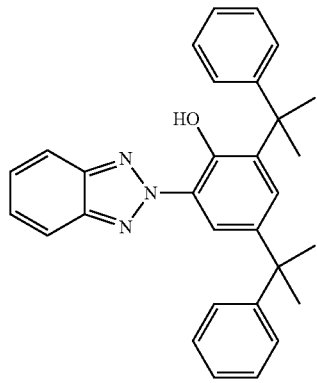 [SMILES: CC(C)(c1ccccc1)c1cc(-n2nc3ccccc3n2)c(O)c(C(C)(C)c2ccccc2)c1]
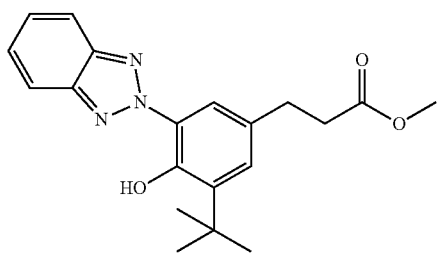 [SMILES: COC(=O)CCc1cc(-n2nc3ccccc3n2)c(O)c(C(C)(C)C)c1]
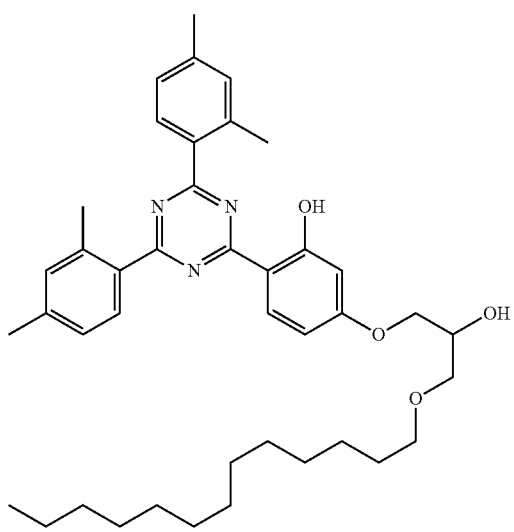 [SMILES: CCCCCCCCCCCCCOCC(O)COc1ccc(-c2nc(-c3ccc(C)cc3C)nc(-c3ccc(C)cc3C)n2)c(O)c1]
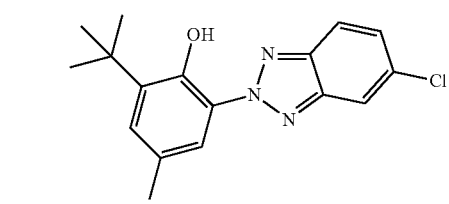 [SMILES: Cc1cc(-n2nc3ccc(Cl)cc3n2)c(O)c(C(C)(C)C)c1]

TABLE F-continued
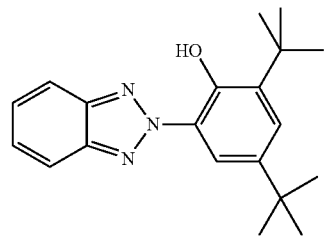 [SMILES: CC(C)(C)c1cc(-n2nc3ccccc3n2)c(O)c(C(C)(C)C)c1]
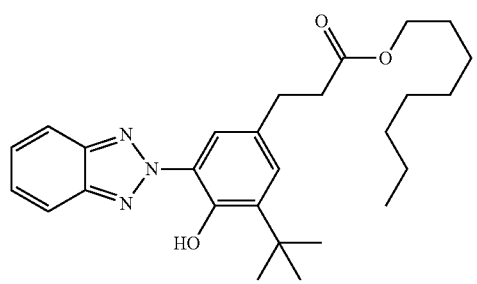 [SMILES: CCCCCCCCOC(=O)CCc1cc(-n2nc3ccccc3n2)c(O)c(C(C)(C)C)c1]
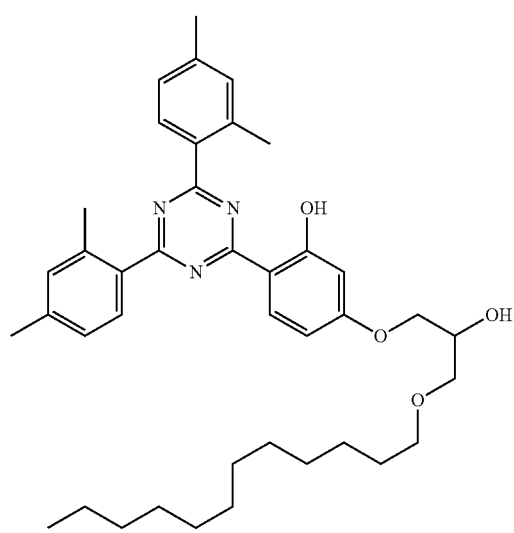 [SMILES: CCCCCCCCCCCCOCC(O)COc1ccc(-c2nc(-c3ccc(C)cc3C)nc(-c3ccc(C)cc3C)n2)c(O)c1]
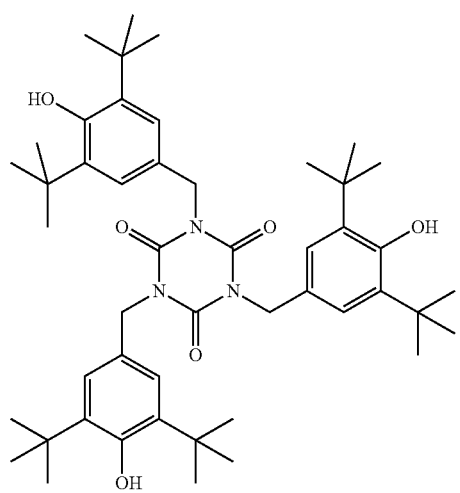 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE F-continued

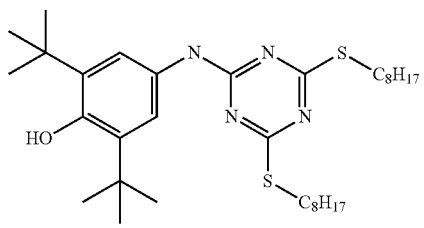

In a preferred embodiment of the present invention, the media according to the invention comprise one or more compounds selected from the group of the compounds from Table F, in particular one or more compounds selected from the group of the compounds of the two formulae

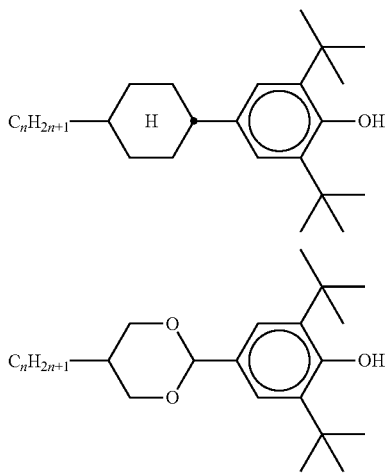

EXAMPLES

The following examples explain the present invention without restricting it in any way. However, the physical properties make it clear to the person skilled in the art what properties can be achieved and in what ranges they can be modified. In particular, the combination of the various properties which can preferably be achieved is thus well defined for the person skilled in the art.

Substance Examples

The following substances are preferred substances of the formula I in accordance with the present application.

1

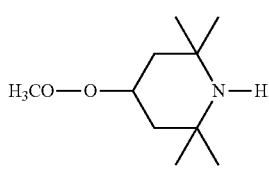

-continued

2

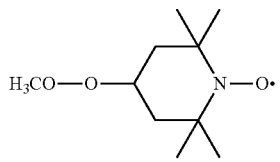

3

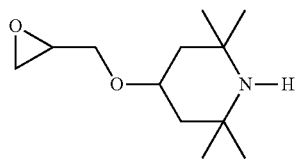

4

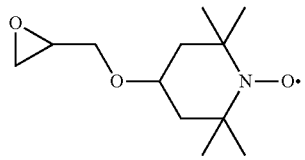

5

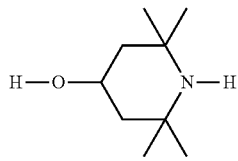

6

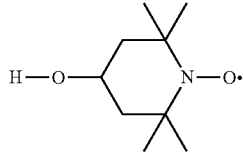

7

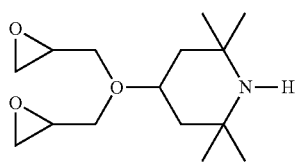

8

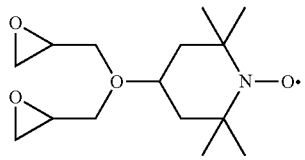

9

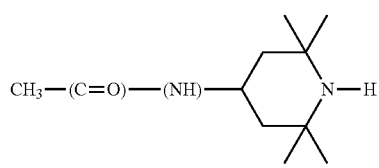

10

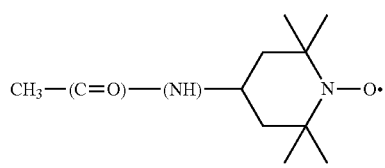

11

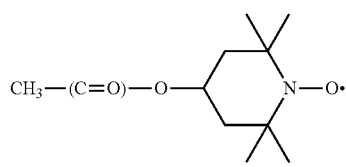

12

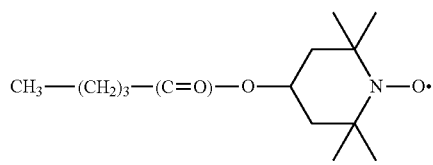

Liquid-crystal mixtures having the composition and properties as indicated in the following tables are prepared.

Example 1 and Comparative Examples 1.0 to 1.5

The following mixture (M-1) is prepared and investigated.

| Mixture M-1 | | |
|---|---|---|
| Composition | | |
| Compound | | Concentration |
| No. | Abbreviation | % by weight |
| 1 | CY-3-O4 | 10.0 |
| 2 | CY-5-O4 | 10.0 |
| 3 | CCY-2-O2 | 10.0 |
| 4 | CCY-3-O2 | 10.0 |
| 5 | CCY-5-O2 | 6.0 |
| 6 | CCY-2-1 | 10.0 |
| 7 | CCY-3-1 | 6.0 |
| 8 | PCH-53 | 12.0 |
| 9 | CCH-34 | 6.0 |
| 10 | CC-3-V | 20.0 |
| Σ | | 100.0 |

| Physical properties |
|---|
| T(N, I) = 68° C. |
| Δn(20° C., 589 nm) = 0.0757 |
| Δε(20°, 1 kHz) = −2.8 |
| $\gamma_1$(20° C.) = n.d. mPa · s |
| $k_{11}$(20° C.) = 12.4 pN |
| $k_{33}$(20° C.) = 13.3 pN |
| $V_0$(20° C.) = 2.31 V |

Note:
n.d.: not determined 360 ppm of the compound of the formula I-1a-2 (TEMPOL) are added to mixture M-1. The resultant mixture (M-1-1) is, like mixture M-1 itself, investigated with respect to its stability to illumination by means of cold-cathode (CCFL) LCD backlighting in a test cell with an alignment material for homeotropic alignment and flat ITO electrodes. To this end, the test cells are exposed to the illumination for more than 1000 hours. The voltage holding ratio is determined in each case after fixed times after 5 minutes at a temperature of 100° C.

The reproducibility of the voltage holding ratio values in various measurement series is in the range from about 3 to 4%.

The decrease in the voltage holding ratio (ΔVHR) usually caused by the load is determined in accordance with the following equation (1):

$$\Delta VHR(t) = VHR(t) - VHR(t=0) \tag{1}$$

If the relative stability ($S_{rel}$) of an LC mixture to LCD backlighting after a time t is determined in accordance with the following equation, equation (2):

$$S_{rel}(t) = \frac{VHRref(t=0) - VHRref(t)}{VHR(t=0) - VHR(t)}, \tag{2}$$

where "ref" stands for the corresponding unstabilised mixture (here M-1), a relative stabilisation of $S_{rel}$ (1000 h)=2.8 is obtained for this example (Example 1) compared with the reference mixture (Comparative Example 1.0). This result corresponds virtually to an effective doubling of the stability of the mixture investigated through the use of 360 ppm of TEMPOL.

Comparative Examples 1.1 to 1.5

Alternatively, 600 ppm of TINUVIN®770 (T770), 770 ppm of TINUVIN®123 (T123), 820 ppm of TINUVIN®622 LD (T622) or 580 ppm of Cyasorb UV-3853S(C3853) are added to mixture M-1. The resultant mixtures (CM-1-1 to CM-1-4) are investigated as described above.

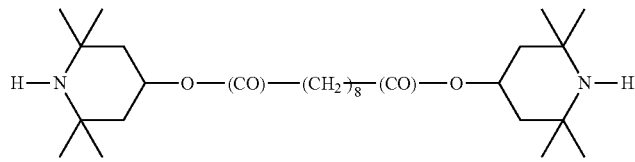

TINUVIN®770 (T770 for short)

-continued

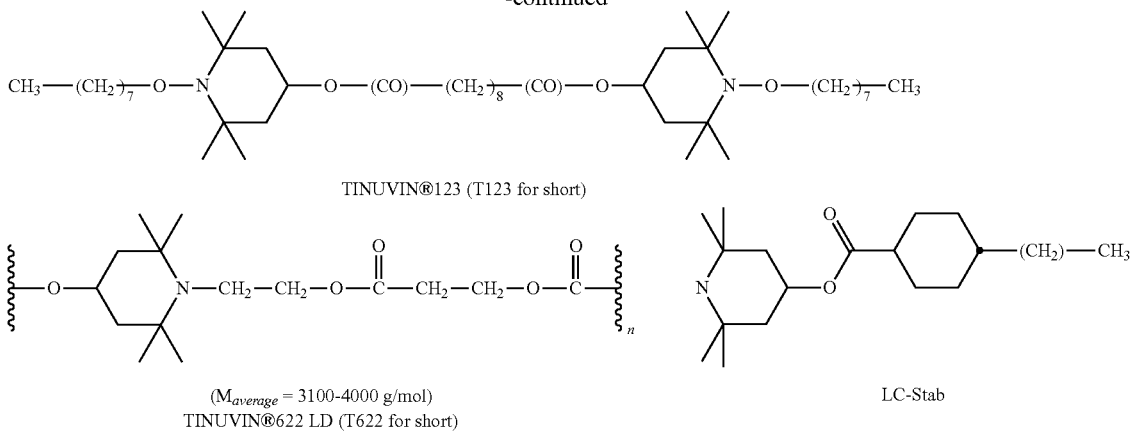

TINUVIN®123 (T123 for short)

($M_{average}$ = 3100-4000 g/mol)
TINUVIN®622 LD (T622 for short)

LC-Stab

Cyasorb UV-3853S(C3853 for short here) is a commercially available product from Cytec, West Paterson, USA, which is employed as light stabiliser, for example in formulations for plastic parts made from polypropylene for the automobile industry and for garden furniture. According to the manufacturer's data, it comprises 50% of a mixture of various HALS of the general formula

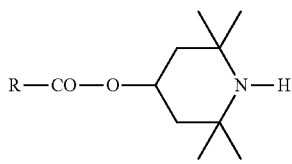

in an LDPE resin, where the alkyl radical "R" in Cyasorb UV-3853S essentially denotes "$C_{11}$ to $C_{20}$" alkyl and predominantly denotes "$C_{16}$ to $C_{18}$" alkyl. According to NA/867, Sep. 1, 2001, NICAS, Government of Australia, "Cyasorb UV-3853S" comprises 50% of polyethylene and the HALS component of "Cyasorb UV-3853S" comprises esters of the following acids:

| Ester of the acid | R | Proportion of the compound in the HALS (% by wt.) |
|---|---|---|
| Stearic acid | —$(CH_2)_{16}$—$CH_3$ | ≈40-65 |
| Palmitic acid | —$(CH_2)_{14}$—$CH_3$ | ≈31-49 |
| Heptadecanoic acid | —$(CH_2)_{15}$—$CH_3$ | ≈0.3-4.8 |
| Myristic acid | —$(CH_2)_{12}$—$CH_3$ | ≈0.1-3.0 |
| Oleic acid | —$(CH_2)_7$—CH=CH—$(CH_2)_7$—$CH_3$ | ≈0.2-4.0 |
| Others | $C_{11}$ to $C_{20}$ | ≈0.2-6.2 |

TABLE 1

| No. | Mixture | Stabiliser | c(stab.)/ppm | VHR (1000 h)/% | $S_{rel}$(1000 h) |
|---|---|---|---|---|---|
| 1 | M-1 | none | 0 | 70.7 | 1.0* |
| 2 | M-1-1 | I-1a-2 | 360 | 89.2 | 2.8 |
| 3 | CM-1-1 | T770 | 600 | 79.6 | 1.5 |
| 4 | CM-1-2 | T123 | 770 | 73.3 | 1.1 |
| 5 | CM-1-3 | T622 | 820 | 79.9 | 1.1 |

TABLE 1-continued

| No. | Mixture | Stabiliser | c(stab.)/ppm | VHR (1000 h)/% | $S_{rel}$(1000 h) |
|---|---|---|---|---|---|
| 6 | CM-1-4 | C3853 | 580 | 73.9 | 1.2 |
| 7 | CM-1-5 | LC-Stab | 640 | 73.4 | 1.1 |

Note:
*not applicable

Example 2

The following mixture (M-2) is prepared and investigated.

| Mixture M-2 | | |
|---|---|---|
| Composition | | |
| Compound | | Concentration |
| No. | Abbreviation | % by weight |
| 1 | CY-3-O4 | 20.0 |
| 2 | CCY-3-O2 | 13.0 |
| 3 | CCY-4-O2 | 5.0 |
| 4 | CPY-2-O2 | 10.0 |
| 5 | CPY-3-O2 | 10.0 |
| 6 | CC-3-4 | 9.0 |
| 7 | CC-3-5 | 4.0 |
| 8 | CC-3-O1 | 9.0 |
| 9 | CC-3-V | 12.0 |
| 10 | CP-3-O1 | 3.0 |
| 11 | CCP-V-1 | 5.0 |
| Σ | | 100.0 |
| Physical properties | | |

T(N, I) = 80°C.
Δn(20° C., 589 nm) = 0.0913
Δε(20°, 1 kHz) = −3.4
$γ_1$(20° C.) = 117 mPa · s
$k_{11}$(20° C.) = 13.6 pN
$k_{33}$(20° C.) = 14.8 pN
$V_0$(20° C.) = 2.19 V

Mixture M-2 is investigated as described in Example 1. To this end, 200 ppm of the compound of the formula I-1a-2 are added to this mixture. The resultant mixture (M-2-1) is, like mixture M-2 itself, investigated in a test cell with respect to its stability to illumination by means of LCD backlighting. To this end, the test cells are exposed to the illumination for 1000 hours. The voltage holding ratio is then determined after 5 minutes at a temperature of 100° C. The relative improvement in the voltage holding ratio here is $S_{rel}$ (1000 h)=1.8.

Example 3 and Comparative Examples 3.0 to 3.2

500 ppm of the compound of the formula I-1a-2 are added to mixture M-1 of Example 1. The resultant mixture (M-1-2) is, like mixture M-1 itself, investigated in a test cell with respect to its stability to illumination by means of LCD backlighting. To this end, the test cells are exposed to the illumination for 1000 hours. The voltage holding ratio is then determined after 5 minutes at a temperature of 100° C. The relative improvement in the voltage holding ratio here is $S_{rel}$(1000 h)=2.8.

Examples 4.1 to 4.3

Example 4.1

500 ppm of the compound of the formula I-1a-2 are added to mixture M-1 of Example 1 (M-1-3), and the mixture is subjected to a temperature of 150° C. for 4 h in a sealed glass bottle. The VHR is subsequently determined and compared with the initial value of the mixture comprising 360 ppm of the compound of the formula I-1a-2 before heating. The VHR is 99% before heating and 98% after heating.

Example 4.2

Both 360 ppm of the compound of the formula I-1a-2 and also 200 ppm of compound OH-1

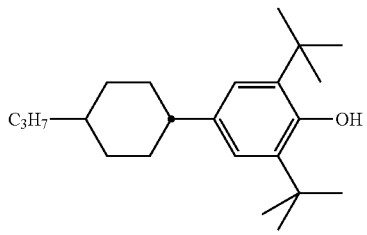

are then added to mixture M-1 (M-1-4). This mixture (M-1-4) was also subjected to a temperature of 150° C. for 4 h. In contrast to the mixture which comprises only 360 ppm of the compound of the formula I-1a-2, but no OH-1, the voltage holding ratio here is at the same level after the heating as before the heating test. The VHR is 96% before heating and 95% after heating.

The two mixtures are investigated with respect to their stability to irradiation by means of LCD backlighting. The results are equally good for both mixtures. It is thus apparent that the addition of phenolic antioxidants is unnecessary on use of stabiliser I-1a-2.

Example 4.3

200 ppm of the compound of the formula I-1a-1 (4-hydroxy-2,2,6,6-tetramethylpiperidine) are added to mixture M-1 of Example 1 (M-1-5), and the mixture is subjected to a temperature of 150° C. for 4 h in a sealed glass bottle. The VHR is subsequently determined and compared with the initial value of the mixture comprising 200 ppm of 4-hydroxy-2,2,6,6-tetramethylpiperidine before the heating. The VHR is 98% before heating and 81% after heating. Here too, relatively favourable properties are obtained with respect to the stability. However, these are somewhat less favourable than in the case of the two preceding examples (Examples 4.1 and 4.2). For this reason, this embodiment is less preferred. However, better results can also be achieved here if a phenol compound is used as additional or supplementary thermal stabiliser in addition to the compound of the formula I-1a-1.

Example 5

200 ppm of the compound of the formula I-1b-2 are added to mixture M-1 of Example 1 (M-1-6), and the mixture is subjected to a temperature of 150° C. for 4 h in a sealed glass bottle. The VHR is subsequently determined and compared with the initial value of the mixture comprising 200 ppm of the compound of the formula I-1b-2 before the heating. The VHR is 98% before heating and 93% after heating.

500 ppm of the compound of the formula I-1b-2 are then added to mixture M-1 of Example 1. The resultant mixture (M-1-7) is, like mixture M-1 itself, investigated in a test cell with respect to its stability to illumination by means of LCD backlighting. To this end, the test cells are exposed to the illumination for 1000 hours. The voltage holding ratio is then determined after 5 minutes at a temperature of 100° C. The relative improvement in the voltage holding ratio here is $S_{rel}$(1000 h)=2.4.

Example 6

200 ppm of the compound of the formula I-6a-2 are added to mixture M-1 of Example 1 (M-1-8), and the mixture is subjected to a temperature of 150° C. for 4 h in a sealed glass bottle. The VHR is subsequently determined and compared with the initial value of the mixture comprising 200 ppm of the compound of the formula I-6a-2 before the heating. The VHR is 98% before heating and 95% after heating.

200 ppm of the compound of the formula I-1b-2 are then added to mixture M-1 of Example 1. The resultant mixture (M-1-9) is, like mixture M-3 itself, investigated in a test cell with respect to its stability to illumination by means of LCD backlighting. To this end, the test cells are exposed to the illumination for 1000 hours. The voltage holding ratio is then determined after 5 minutes at a temperature of 100° C. The relative improvement in the voltage holding ratio here is $S_{rel}$(1000 h)=2.2.

Example 6 and Comparative Examples 6.0 and 6.1

The following mixture (M-3), which comprises 40% of compounds containing an alkenyl end group, is prepared and investigated.

| Mixture M-3 | | |
|---|---|---|
| Composition | | |
| Compound | | Concentration |
| No. | Abbreviation | % by weight |
| 1 | CY-3-O2 | 10.0 |
| 2 | PY-3-O2 | 10.0 |
| 3 | CCY-3-O2 | 11.0 |
| 4 | CPY-2-O2 | 8.5 |
| 5 | CPY-3-O2 | 10.5 |
| 6 | PYP-2-3 | 7.0 |

-continued

Mixture M-3

| | | |
|---|---|---|
| 7 | CC-3-V | 33.5 |
| 8 | CC-3-V1 | 6.5 |
| 9 | CCP-3-1 | 3.0 |
| Σ | | 100.0 |

Physical properties

T(N, I) = 74.9° C.
$n_e$(20° C., 589 nm) = 1.5931
$\Delta n$(20° C., 589 nm) = 0.1081
$\epsilon_\perp$(20°, 1 kHz) = 6.5
$\Delta\epsilon$(20°, 1 kHz) = −3.0
$\gamma_1$(20° C.) = n.d. mP · s
$k_{11}$(20° C.) = 13.0 pN
$k_{33}$(20° C.) = 15.9 pN
$V_0$(20° C.) = 2.43 V Mixture M-3 is, as described in Example 1, divided into three parts and, as described therein, investigated as such or alternatively mixed with the compound of Substance Example 11

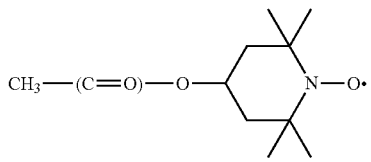

or with TINUVIN®770, and the corresponding mixtures are investigated in test cells with respect to their stability to illumination by means of LCD backlighting. For the mixture which comprises the compound of the formula shown, comparably favourable results are also achieved here as in Example 1. These are compiled in the following table (Table 2).

TABLE 2

| Ex. | No. | Mixture | Stabiliser | c(stab.)/ ppm | VHR(t)/% t = 0 h | t = 750 h | $S_{rel}(t)$ t = 750 h |
|---|---|---|---|---|---|---|---|
| C6.0 | 1 | M-3 | none | 0 | 98.0 ± 0.3 | 68 ± 2 | 1 |
| C6.1 | 2 | CM-3-1 | T770 | 250 | 96.6 ± 0.4 | 79 ± 2 | 1.7 |
| B6 | 3 | M-3-1 | I* | 50 | 97.2 ± 0.2 | 79 ± 2 | 1.6 |

Notes:
I*: Compound of the formula (11) shown above
T770 TINUVIN ®770

In addition, the ion densities were determined for the three mixtures. The results are compiled in the following table (Table 3).

TABLE 3

| Ex. | No. | Mixture | Stabiliser | c(stab.)/ ppm | Ion density/ pC | $S_{rel}(t)$ t = 750 h |
|---|---|---|---|---|---|---|
| C6.0 | 1 | M-3 | none | 0 | 181 ± 25 | 1.0 |
| C6.1 | 2 | CM-3-1 | T770 | 250 | 1.031 ± 58 | 1.7 |
| B6 | 3 | M-3-1 | I* | 50 | 223 ± 32 | 1.6 |

Notes:
I*: Compound of the formula (11) shown above
T770: TINUVIN ®770

It is readily evident here that the above-mentioned compound exhibits significantly stabilising properties even in relatively low concentrations. The voltage holding ratio is significantly superior to that of the starting mixture and is comparable with that of the comparative mixture. In addition, the ion density is virtually unchanged compared with the undoped reference. TINUVIN®770, by contrast, exhibits an ion density which is four times as high. The behaviour of the above-mentioned compound overall thus appears significantly more favourable.

Example 7 and Comparative Examples 7.0 and 7.1

Mixture M-3 of Example 6 is, as described therein, divided into three parts and, as described therein, investigated as such or alternatively mixed with the compound of Substance Example 12

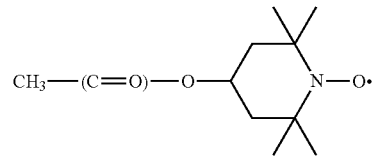

or with TINUVIN®770, and the corresponding mixtures are investigated in test cells with respect to their stability to illumination by means of LCD backlighting. For the mixture which comprises the compound shown, comparably favourable results are also achieved here as in Example 6. These are compiled in the following tables (Tables 4 and 5).

TABLE 4

| Ex. | No. | Mixture | Stabiliser | c(stab.)/ ppm | VHR(t)/% t = 0 h | t = 750 h | $S_{rel}(t)$ t = 750 h |
|---|---|---|---|---|---|---|---|
| C7.0 | 1 | M-3 | none | 0 | 98.0 ± 0.3 | 68 ± 2 | 1 |
| C7.1 | 2 | CM-3-1 | T770 | 250 | 96.6 ± 0.4 | 79 ± 2 | 1.7 |
| B7 | 3 | M-3-2 | I* | 50 | 97.3 ± 0.3 | 78 ± 2 | 1.6 |

Notes:
I*: Compound of the formula (12) shown above
T770 TINUVIN ®770

TABLE 5

| Ex. | No. | Mixture | Stabiliser | c(stab.)/ ppm | Ion density/ pC | $S_{rel}(t)$ t = 750 h |
|---|---|---|---|---|---|---|
| C7.0 | 1 | M-3 | none | 0 | 181 ± 25 | 1.0 |
| C7.1 | 2 | CM-3-1 | T770 | 250 | 1.031 ± 58 | 1.7 |
| B7 | 3 | M-3-2 | I* | 50 | 250 ± 43 | 1.5 |

Notes:
I*: Compound of the formula (12) shown above
T770: TINUVIN ®770

It is also evident here that the above-mentioned compound exhibits significantly stabilising properties even in relatively low concentrations. The voltage holding ratio is significantly superior to that of the starting mixture and is at least comparable to that of the comparative mixture. In addition, the ion density is virtually unchanged compared with the undoped reference. TINUVIN®770, by contrast, exhibits an ion density which is four times as high. The behaviour of the above-mentioned compound in total thus also looks significantly more favourable.

The invention claimed is:
1. A liquid-crystalline medium having a nematic phase and negative dielectric anisotropy which comprises a) one or more compounds of formula I or one or more compounds of formula I-1a

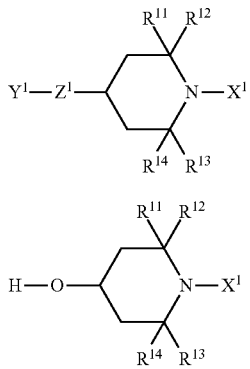

in which $R^{11}$ to $R^{14}$ each, independently of one another, denote alkyl having 1 to 4 C atoms, $X^1$ denotes $O^\bullet$, $Y^1$ and $Y^{01}$ each, independently of one another, denote straight-chain or branched alkyl having 1 to 10 C atoms, also cycloalkyl, cycloalkylalkyl or alkylcycloalkyl, where one or more —CH$_2$— groups in each of these groups may each be replaced by —O— in such a way that no two O atoms in the molecule are connected directly to one another, and $Z^1$ denotes —O—, —(CO)—O—, —O—(CO)—, —O—(CO)—O—, —NH—, —NY$^{01}$— or —NH—(CO)—, and, in the case where $Z^1$ denotes —O—(CO)—O—, $Y^1$ may also denote

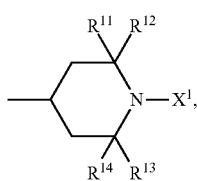

and b) one or more compounds of formula II

in which $R^{21}$ denotes an unsubstituted alkyl radical having 1 to 7 C atoms or an unsubstituted alkenyl radical having 2 to 7 C atoms, and $R^{22}$ denotes an unsubstituted alkenyl radical having 2 to 7 C atoms, and c) one or more compounds selected from formulae III-1 to III-4

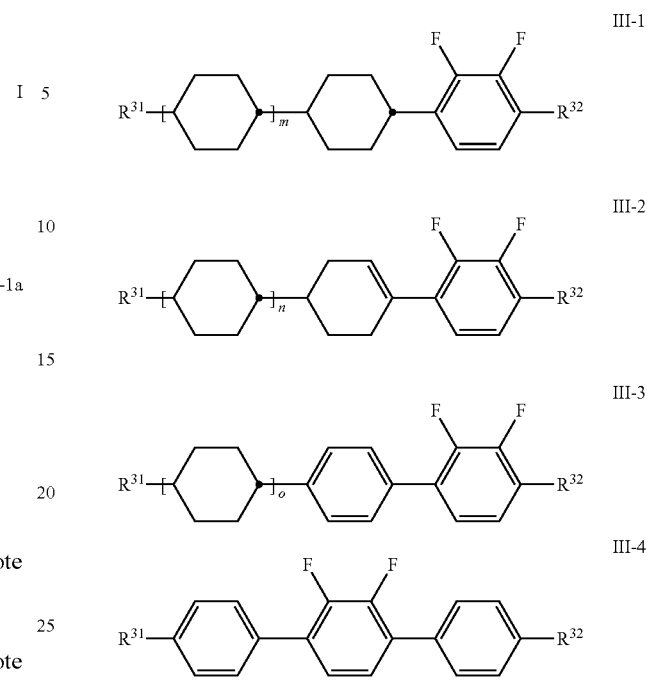

in which $R^{31}$ denotes an unsubstituted alkyl radical having 1 to 7 C atoms, $R^{32}$ denotes an unsubstituted alkyl radical having 1 to 7 C atoms or an unsubstituted alkoxy radical having 1 to 6 C atoms, and m, n and o each, independently of one another, denote 0 or 1.

2. The medium according to claim 1, wherein said medium comprises one or more compounds of formula II, in which $R^{22}$ denotes vinyl.

3. The medium according to claim 2, wherein said medium comprises a compound of formula II, in which $R^{21}$ denotes n-propyl and $R^{22}$ denotes vinyl.

4. The medium according to claim 3, wherein the total concentration of the compounds of the formula II, in the medium as a whole is 25% or more to 45% or less.

5. The medium according to claim 1, wherein said medium comprises one or more compounds of formula III-2-2

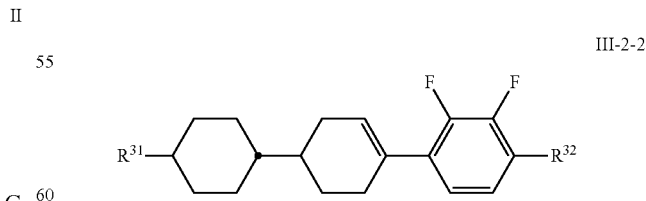

in which $R^{31}$ and $R^{32}$ have the respective meanings given for formula III-2 in claim 1.

6. The medium according to claim 1, wherein said medium comprises one or more compounds of the formula III-3-2

III-3-2

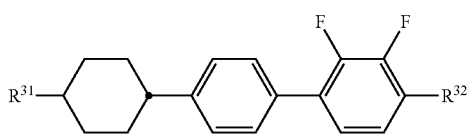

in which R³¹ and R³² have the respective meanings given for formula III-2 in claim 1.

7. The medium according to claim 1, wherein said medium comprises one or more compounds of the formula III-4.

8. The medium according to claim 1, wherein said medium comprises one or more chiral compounds.

9. An electro-optical display or electro-optical component, wherein said display or component contains a liquid-crystalline medium according to claim 1.

10. The display or component according to claim 9, wherein said display or component is based on the VA or ECB effect.

11. The display or component according to claim 9, wherein said display or component comprises an active-matrix addressing device.

12. A method of generating an electro-optical effect comprising applying a voltage to an electro-optical display or electro-optical component according to claim 9.

13. A process for the preparation of a liquid-crystalline medium according to claim 1, comprising mixing one or more compounds of formula I or formula I-1a with one or more compounds of formula II and one or more compounds selected from formulae III-1 to III-4.

14. A process for the stabilization of a liquid-crystalline medium which comprises one or more compounds of the formula II

II in which
R²¹ denotes an unsubstituted alkyl radical having 1 to 7 C atoms or an unsubstituted alkenyl radical having 2 to 7 C atoms, and
R22 denotes an unsubstituted alkenyl radical having 2 to 7 C atoms,
and one or more compounds selected from formulae III-1 to III-4

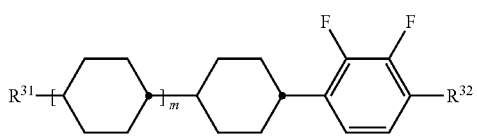

III-1

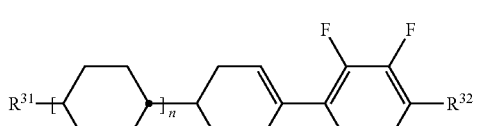

III-2

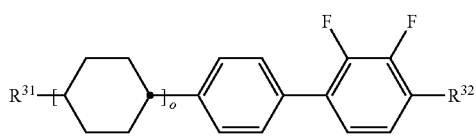

III-3

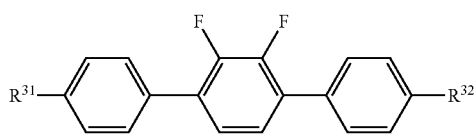

III-4 in which
R³¹ denotes an unsubstituted alkyl radical having 1 to 7 C atoms,
R³² denotes an unsubstituted alkyl radical having 1 to 7 C atoms or an unsubstituted alkoxy radical having 1 to 6 C atoms, and
m, n and o each, independently of one another, denote 0 or 1,
said method comprising adding to said medium one or more compounds of formula I or formula I-1a

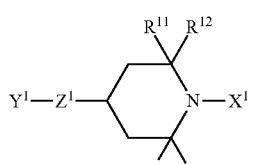

I

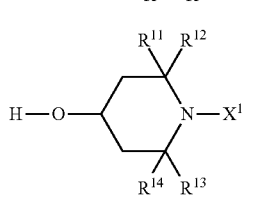

I-1a in which
$R^{11}$ to $R^{14}$ each, independently of one another, denote alkyl having 1 to 4 C atoms,
$X^1$ denotes O•,
$Y^1$ and $Y^{01}$ each, independently of one another, denote straight-chain or branched alkyl having 1 to 10 C atoms, also cycloalkyl, cycloalkylalkyl or alkylcycloalkyl, where one or more —CH₂— groups in each of these groups may each be replaced by —O— in such a way that no two O atoms in the molecule are connected directly to one another, and
$Z^1$ denotes —O—, —(CO)—O—, —O—(CO)—, —O—(CO)—O—, —NH—, —NY$^{01}$— or —NH—(CO)—,
and, in the case where $Z^1$ denotes —O—(CO)—O—, $Y^1$ may also denote

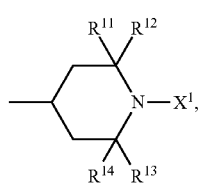

, and optionally one or more compounds selected from formulae OH-1 to OH-6,

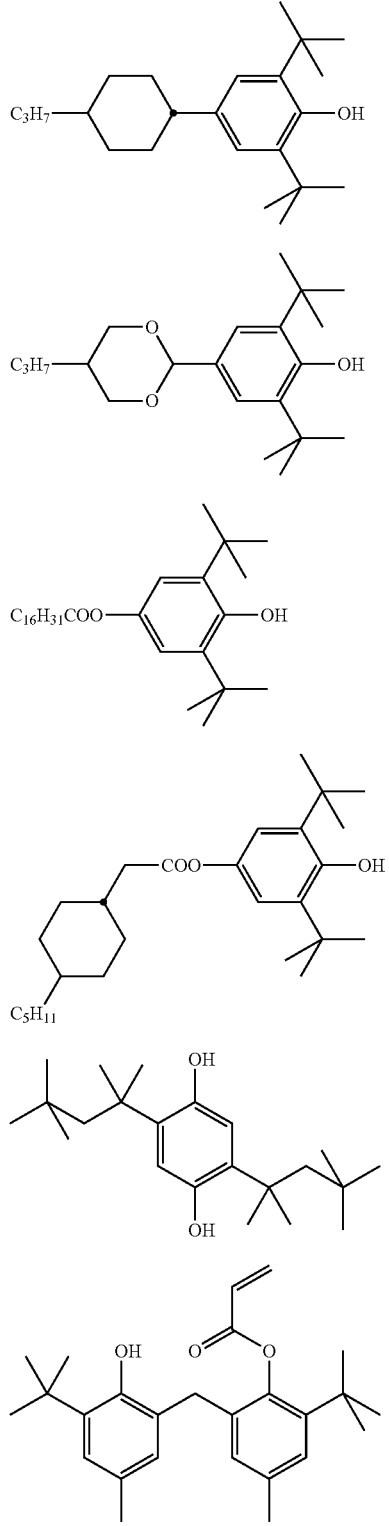

OH-1

OH-2

OH-3

OH-4

OH-5

OH-6 are added to the medium.

15. The medium according to claim 1, wherein said medium contains one or more compounds of formula I-1a-2:

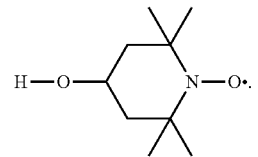

I-1a-2

16. The medium according to claim 1, wherein said medium contains one or more compounds of formula I.

17. The medium according to claim 1, wherein said medium contains one or more compounds of formula I selected the compounds of formulae I-1 to I-7:

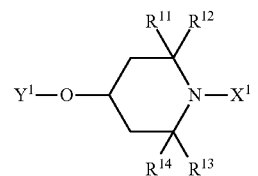

I-1

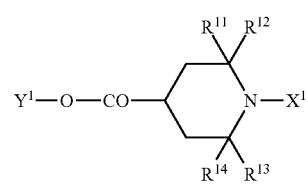

I-2

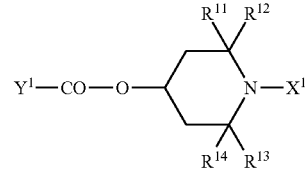

I-3

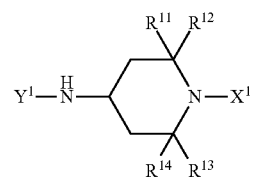

I-4

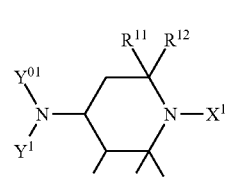

I-5

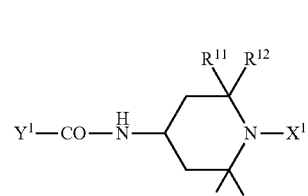

I-6

I-7

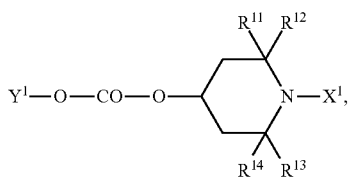

wherein $Y^1$, $Y^{01}$, $X^1$, and $R^{11}$—$R_{14}$ are as defined in claim 1.

18. The medium according to claim 1, wherein said medium contains one or more compounds of formula I selected the compounds of formulae I-1b to I-7b:

I-1b

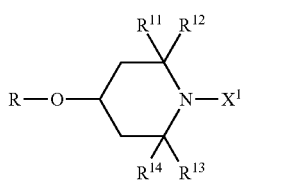

I-2a

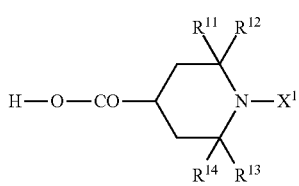

I-2b

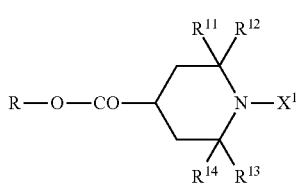

I-3a

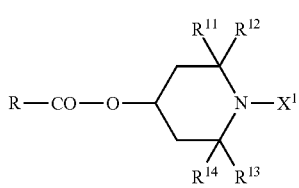

I-4a

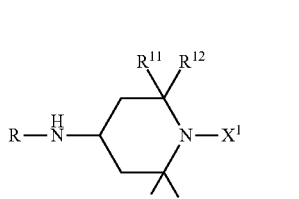

I-4b

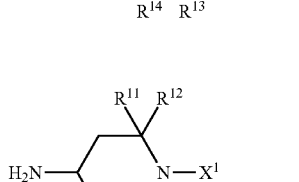

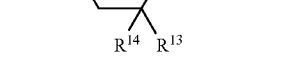

I-5a

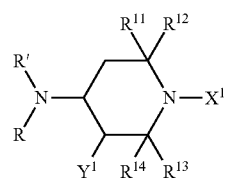

I-6a

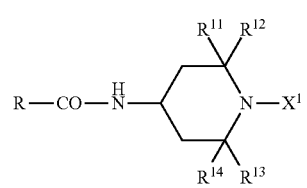

I-7a

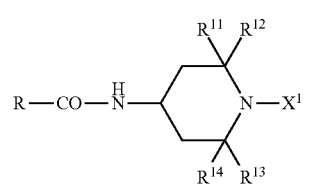

I-7b

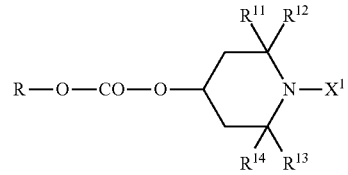

wherein $Y^1$, $Y^{01}$, $X^1$, and $R^{11}$—$R^{14}$ are as defined in claim 1, and R and R' each, independently of one another, denote straight-chain or branched alkyl having 1 to 10 C atoms, also cycloalkyl, cycloalkylalkyl or alkylcycloalkyl, where one or more —CH$_2$— groups in each of these groups may each be replaced by —O— in such a way that no two O atoms in the molecule are connected directly to one another.

19. The medium according to claim 1, wherein said medium contains one or more compounds of formula I selected the following compounds of formulae I-1b-2, I-1b-4, I-5a-2, and I-6a-2:

I-1b-2

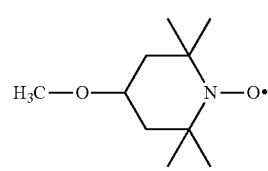

I-1b-4

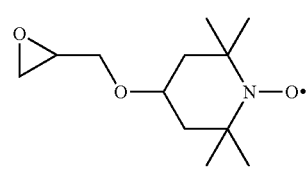

-continued
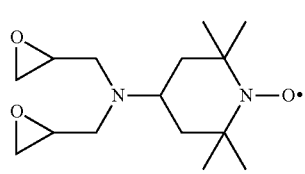
I-5a-2
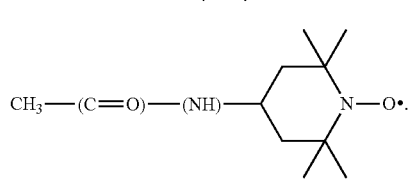
I-6a-2
20. The medium according to claim 1, wherein said medium contains one or more dielectrically negative compounds of formula II in a total concentration in the range from 5% to 90%, and contains one or more compounds selected from formulae III-1 to III-4 in a total concentration in the range from 10% to 80%.
* * * * *